(12) United States Patent
Blaine et al.

(10) Patent No.: US 11,266,156 B2
(45) Date of Patent: Mar. 8, 2022

(54) PORTIONING/TRIMMING OF RIB PRIMAL CUTS

(71) Applicant: John Bean Technologies Corporation, Chicago, IL (US)

(72) Inventors: George R. Blaine, Lake Stevens, WA (US); David A. Below, Port Clinton, OH (US); Matthew F. Falkoski, Bothell, WA (US)

(73) Assignee: John Bean Technologies Corporation, Chicago, IL (US)

( * ) Notice: Subject to any disclaimer, the term of this patent is extended or adjusted under 35 U.S.C. 154(b) by 142 days.

(21) Appl. No.: 16/810,256

(22) Filed: Mar. 5, 2020

(65) Prior Publication Data

US 2020/0288729 A1 Sep. 17, 2020

Related U.S. Application Data

(60) Provisional application No. 62/816,782, filed on Mar. 11, 2019.

(51) Int. Cl.
*A22C 17/00* (2006.01)
*G05B 17/02* (2006.01)

(52) U.S. Cl.
CPC ........ *A22C 17/002* (2013.01); *A22C 17/0093* (2013.01); *G05B 17/02* (2013.01)

(58) Field of Classification Search
CPC .............. A22C 17/002; A22C 17/0093; A22C 17/0073; A22C 17/0086; G05B 17/02
USPC .................................. 452/149–152, 156, 157
See application file for complete search history.

(56) References Cited

U.S. PATENT DOCUMENTS

| 4,875,254 A * | 10/1989 | Rudy ................... A22C 17/002 452/157 |
| 5,365,186 A * | 11/1994 | Ensley ..................... H01J 25/00 330/4 |
| 5,868,056 A * | 2/1999 | Pfarr ........................ B23Q 5/34 83/578 |

(Continued)

FOREIGN PATENT DOCUMENTS

| AU | 2004205170 A1 | 3/2005 |
| EP | 1 174 034 A1 | 1/2002 |
| WO | 02/43502 A2 | 6/2002 |

OTHER PUBLICATIONS

International Search Report and Written Opinion dated Jun. 2, 2020, in corresponding International Patent Application No. PCT/US2020/019956, filed Feb. 26, 2020, 15 pages.

*Primary Examiner* — Richard T Price, Jr.
(74) *Attorney, Agent, or Firm* — Christensen O'Connor Johnson Kindness PLLC

(57) ABSTRACT

An animal ribcage primal cut having a bone array located therein is portioned into one or more sub primal cuts, each having at least one bone located therein. The primal cut is scanned at scanning station 14 while being conveyed on a conveyor 12 to determine the physical characteristics of the primal cut. A processor 18 determines how to portion the primal cut into desired sub primal cuts in accordance with desired physical characteristics of the sub primal cut and production requirements for the sub primal cuts. A controller controls a cutter to divide the primal cut into one or more sub primal cuts according to the determination previously made on how to portion the primal cut into desired sub primal cuts.

20 Claims, 7 Drawing Sheets

(56) References Cited

U.S. PATENT DOCUMENTS

| | | | | |
|---|---|---|---|---|
| 5,902,177 | A * | 5/1999 | Tessier | A22C 17/0046 |
| | | | | 452/156 |
| 6,826,989 | B1 * | 12/2004 | Wattles | A22C 17/0093 |
| | | | | 83/102 |
| 6,854,590 | B2 * | 2/2005 | Rudy | B26D 7/20 |
| | | | | 198/690.2 |
| 7,841,264 | B2 * | 11/2010 | Kim | B26D 5/34 |
| | | | | 83/13 |
| 8,688,259 | B1 * | 4/2014 | Blaine | B26D 5/007 |
| | | | | 700/186 |
| 2020/0068908 | A1 * | 3/2020 | Blaine | A22B 5/16 |
| 2020/0288729 | A1 * | 9/2020 | Blaine | A22C 17/0093 |
| 2021/0227840 | A1 * | 7/2021 | Blaine | B26D 5/007 |

* cited by examiner

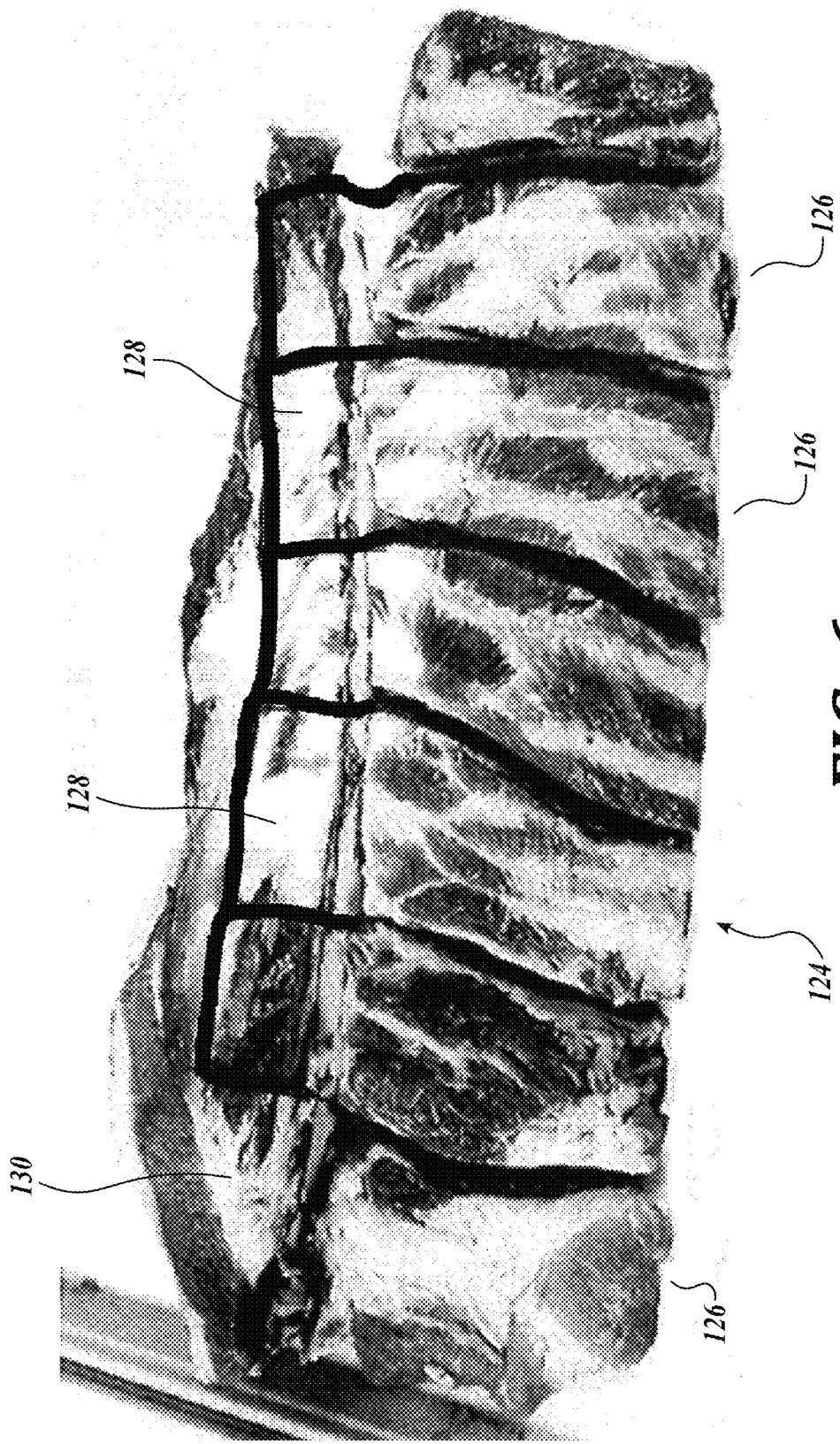

PORTIONING/TRIMMING OF RIB PRIMAL CUTS

CROSS-REFERENCE TO RELATED APPLICATION

This application claims the benefit of U.S. Provisional Application No. 62/816,782, filed Mar. 11, 2019, the entire contents of which are expressly incorporated by reference herein.

BACKGROUND

Slaughterhouses portion the carcasses of meat producing quadruped animals, such as beef, hogs and lambs, into two similar halves by cutting down the middle of the backbone. The carcass halves are then further portioned into primal cuts, which for hogs include the front and rear hocks, fat back, loin, ribcage, belly, shoulder, ham and jowl. A midsection of the hog contains the fat back, loin, ribcage, and belly. The ribcage is removed from the midsection as a primal and then portioned or cut into sub primal cuts, including spare ribs, rib tips, baby back ribs, and country style ribs. See FIG. 1.

The highest value pork rib sub primal is termed the St. Louis rack or St. Louis style ribs, which is produced by trimming the spare ribs in a specific manner as shown in FIG. 2. To produce a St. Louis style rib rack, the end flap located outwardly of the smallest rib is trimmed off. Next, a relatively straight cut is made along the top of the rack but below the cartilage embedded in the brisket. Typically, these cuts are made by hand or perhaps with a powered band saw. Such cuts are not always easy to make because the ribs and cartilage are embedded within the meat and not visible to the operator of the knife or band saw. In this regard, sometimes the cartilage may extend toward the shorter ribs so that a horizontal cut made at the height of the longer ribs may cut through the cartilage. Also, it is often difficult to make curved cuts through the spare rib rack when seeking to produce a St. Louis style cut.

Also, there may be a need to portion a rib rack, whether spare ribs, baby back ribs or country style ribs into portions or sub racks. Since the bones/ribs are not visible, and because bones are not always straight in length, it may be difficult to accurately slice along the gap existing between two ribs so as to leave a uniform or equal amount of meat along both of the ribs adjacent the cut being made. As can be appreciated, it would be desirable to trim and portion rib primal cuts of pork, beef, lamb, etc., accurately but without danger to personnel, and also so as to minimize miss-cuts as well as achieve improved yields of higher quality rib meat products. The present disclosure seeks to provide a system and method that addresses the foregoing needs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an embodiment of the present disclosure, a meat food item with embedded bone array is portioned and trimmed into one or more final pieces having desired physical characteristics, including at least one bone embedded therein. The workpiece is scanned while being conveyed to generate data regarding the physical characteristics of the workpiece. Data generated by the scanning of the workpiece is used to determine the physical characteristics of the workpiece, including the location, shape and size of the bones embedded in the workpiece. A determination is made regarding how to portion the workpiece by cutting one or more portions of the workpiece in accordance with the desired physical characteristics of the portions, including having at least one bone embedded in a portion.

In accordance with an embodiment of the present disclosure, a method and system are provided for portioning a food workpiece having an array of bones embedded in the workpiece into one or more final pieces that include one or more bones embedded therein. The portioning is also based on the desired physical characteristics of the final pieces, including the physical characteristics of the bones embedded in the final pieces. The method and system include designating desired physical characteristics of the final pieces, including physical characteristics pertaining to the one or more bones embedded in the final pieces. The workpiece is scanned to obtain data regarding the physical characteristics of the workpiece. This data is used to model the workpiece including modeling the location of the bones embedded in the workpiece. A determination is made as to how to divide the workpiece based on the modeled workpiece and the desired physical characteristics of the final pieces. A cutter is controlled to cut the workpiece in accordance with the determination made as to how to divide the workpiece.

In accordance with an embodiment of the present disclosure, a method for portioning or trimming a ribcage primal cut of a quadruped animal with an embedded bone array into one or more sub primal cuts and/or different types of sub primal cuts, comprising:

(a) designating desired criteria of the sub primal cuts;

(b) scanning the primal cut to generate a first data set regarding the physical characteristics of the primal cut;

(c) using the first data set to determine the physical characteristics of the primal cut including the location and size of the bones of the bone array;

(d) determining how to divide the primal cut into one or more sub primal cuts in accordance with:

the determined physical characteristics of the primal cut; and desired criteria of the sub primal cuts comprising desired designated physical characteristics of the sub primal cuts; and (e) cutting the primal cut into one or more sub primal cuts in accordance with the determination on how to divide the primal cut.

In accordance with an embodiment of the present disclosure, a method for portioning or trimming an animal ribcage primal cut having a bone array located in the primal cut into sets of one or more sub primal cuts, comprising:

(a) designating desired criteria of the sub primal cuts (b) scanning the primal cut to generate a first data set regarding the physical characteristics of the primal cut;

(c) using the first data set to generate a model of the primal cut including the locations and sizes of the bones of the bone array;

(d) simulating dividing the primal cut into a plurality of sets of sub primal cuts with at least one sub primal cut;

(e) rating each of the simulated sets of sub primal cuts based on the desired physical characteristics of the sub primal cuts; and (f) cutting the primal cut into a set of sub primal cuts based on the ratings of the simulated sets of sub primal cuts.

In accordance with any of the embodiments described herein, wherein the model of the primal cut is selected from the group including a two-dimensional model and a three-dimensional model.

In accordance with any of the embodiments described herein, wherein the model of the primal cut includes determinations selected from the group consisting of the number of bones in the primal cut, the location of the bones in the primal cut, the size of the bones in the primal cut, the shape of the bones in the primal cut, whether any of the bones in the primal cut are broken or otherwise damaged.

In accordance with any of the embodiments described herein, wherein the model includes determinations selected from the group consisting of length of the primal cut, the width of the primal cut, the aspect ratio of the primal cut, the size of the primal cut, the weight of the primal cut, the shape of the primal cut, the thickness of the primal cut, the flatness of the primal cut, the fat content of the primal cut, the location of fat on the primal cut, the extent of gristle in the primal cut, the location of the gristle in the primal cut, the amount of cartilage in the primal cut, the location of the cartilage in the primal cut.

In accordance with an embodiment of the present disclosure, a system for portioning or trimming an animal ribcage primal cut having a bone array located in the primal cut into one or more sub primal cuts of designated desired criteria, each sub primal cut having at least one bone located therein, comprising:

(a) a conveyor for conveying the primal cut;

(b) a scanner for scanning the primal cut to generate a first data set regarding the physical characteristics of the primal cut;

(c) a cutter for cutting the primal cut into one or more sub primal cuts;

(d) a control system, (i) using the first data set to determine the physical characteristics of the primal cut, including the location and size of the bones of the bone array;

(ii) determining how to divide the primal cut one or more sub primal cuts in accordance with: (A) the determined physical characteristics of the sub primal cut; and (B) desired criteria comprising desired physical characteristics of the sub primal cuts; and (iii) controlling the cutter to divide the primal cut into one or more sub primal cuts according to the determination on how to cut the primal cut.

In accordance with an embodiment of the present disclosure, further comprising a conveyor for conveying the primal cut during scanning and cutting of the primal cut.

In accordance with any of the embodiments described herein, further comprising a first conveyor for conveying the primal cut during scanning the primal cut, and a second conveyor for conveying the primal cut during the cutting of the primal cut.

In accordance with any of the embodiments described herein, wherein the first conveyor is structurally compatible with the scanning technology used to scan the primal cut.

In accordance with any of the embodiments described herein, wherein the second conveyor is structurally compatible with the cutter technology used to cut the primal cut.

In accordance with any of the embodiments described herein, wherein the determined physical characteristics of the primal cut are selected from the group consisting of the number of bones in the primal cut, the location of the bones in the primal cut, the size of the bones in the primal cut, the shape of the bones in the primal cut, whether any of the bones in the primal cut are broken or otherwise damaged.

In accordance with any of the embodiments described herein, wherein the determined physical characteristics of the primal cut are selected from the group consisting of the length of the primal cut, the width of the primal cut, the aspect ratio of the primal cut, the size of the primal cut, the weight of the primal cut, the shape of the primal cut, the thickness of the primal cut, the flatness of the primal cut, the fat content of the primal cut, the location of fat on the primal cut, the extent of gristle in the primal cut, the location of the gristle in the primal cut, the amount of cartilage in the primal cut, the location of the cartilage in the primal cut.

In accordance with any of the embodiments described herein, wherein the desired designated physical characteristics of the sub primal cuts comprising the physical characteristics of established types of sub primal cuts.

In accordance with any of the embodiments described herein, wherein the established types of sub primal cuts comprise pork sub primal cuts selected from the group consisting of St. Louis style ribs, Kansas City style ribs, spare rib rack, spare rib sub rack, baby back rib rack, baby back rib sub rack, country style ribs.

In accordance with any of the embodiments described herein, wherein the desired designated physical characteristics of the sub primal cuts are selected from the group consisting of the weight of the sub primal cut, the size of the sub primal cut, the shape of the sub primal cut, the length of the sub primal cut, the width of the sub primal cut, the thickness of the sub primal cut, the flatness of the sub primal cut, the fat content of the sub primal content, the cartilage content of the sub primal cut.

In accordance with any of the embodiments described herein, wherein the desired designated physical characteristics of the sub primal cuts are selected from the group consisting of the number of bones in the sub primal cut, the size of the bones in the sub primal cut, the location of the bones in the sub primal cut, the condition of the bones in the sub primal cut, whether any of the bones in the sub primal cut are broken or otherwise damaged.

In accordance with any of the embodiments described herein, wherein the desired criteria of the sub primal cut comprises production requirements for the sub primal cuts.

In accordance with any of the embodiments described herein, wherein the production requirements for the sub primal cuts are selected from the group consisting of: the total number of sub primal cuts; the total number of each type of sub primal cut; the total weight of the sub primal cuts; the total weight of each type of sub primal cut; the maximum weight of the sub primal cut; the minimum weight of the sub primal cut; the maximum length of the sub primal cut; the minimum length of the sub primal cut; the maximum width of the sub primal cut; the minimum width of the sub primal cut; the maximum thickness of the sub primal cut; the minimum thickness of the sub primal cut.

In accordance with any of the embodiments described herein, further comprising identifying the desired physical characteristics of a plurality of acceptable sub primal cuts to be portioned from a primal cut.

In accordance with any of the embodiments described herein, further comprising rating each of the plurality of acceptable sub primal cuts according to value.

In accordance with any of the embodiments described herein, further comprising conveying the primal cut during scanning and cutting of the primal cut.

In accordance with any of the embodiments described herein, further comprising conveying the primal cut on the first conveyor that is structurally compatible with the scanning technology being used in scanning the primal cut, and then conveying the scanned primal cut on a second conveyor during the cutting of the primal cut, the second conveyor that is structurally compatible with the cutting technology used to cut the primal cut.

In accordance with any of the embodiments described herein, wherein the scanning technology is selected from the group consisting of X-ray scanning, single-energy source X-ray scanning, dual-energy source X-ray scanning, photon-counting, multi-bin X-ray scanning, infrared scanning, sonar scanning, ultra sound scanning, CAT scanning and MRI scanning.

In accordance with any of the embodiments described herein, further comprising scanning the primal cut on the second conveyor to generate a second data set corresponding to physical parameters of the primal cut selected from the group consisting of the location of the primal cut on the second conveyor, the orientation of primal cut on the second conveyor, the shape of the primal cut, the size of the primal cut, etc.

In accordance with any of the embodiments described herein, wherein the first and second data sets are compared, and a determination is made whether a sufficient variation exists between the first and second data sets to require translation of the first data set into the second data set.

In accordance with any of the embodiments described herein, wherein the translation of the first data set into the second data set comprising one or more of:

directional translation of the primal cut;
rotational translation of the primal cut;
scaling of the size of the primal cut;
shear distortion of the primal cut.

In accordance with any of the embodiments described herein, wherein the first data set is compared with the second data set using an analysis methodology selected from the group consisting of:

a root mean square analysis of the first and second data set;
standard deviation analysis of the first and second data set; and
a least squares regression of the first and second data sets.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6 is a photograph of a spare rib rack showing how the rack may be subdivided into several sub racks;

DETAILED DESCRIPTION

Introduction

Figure 1:
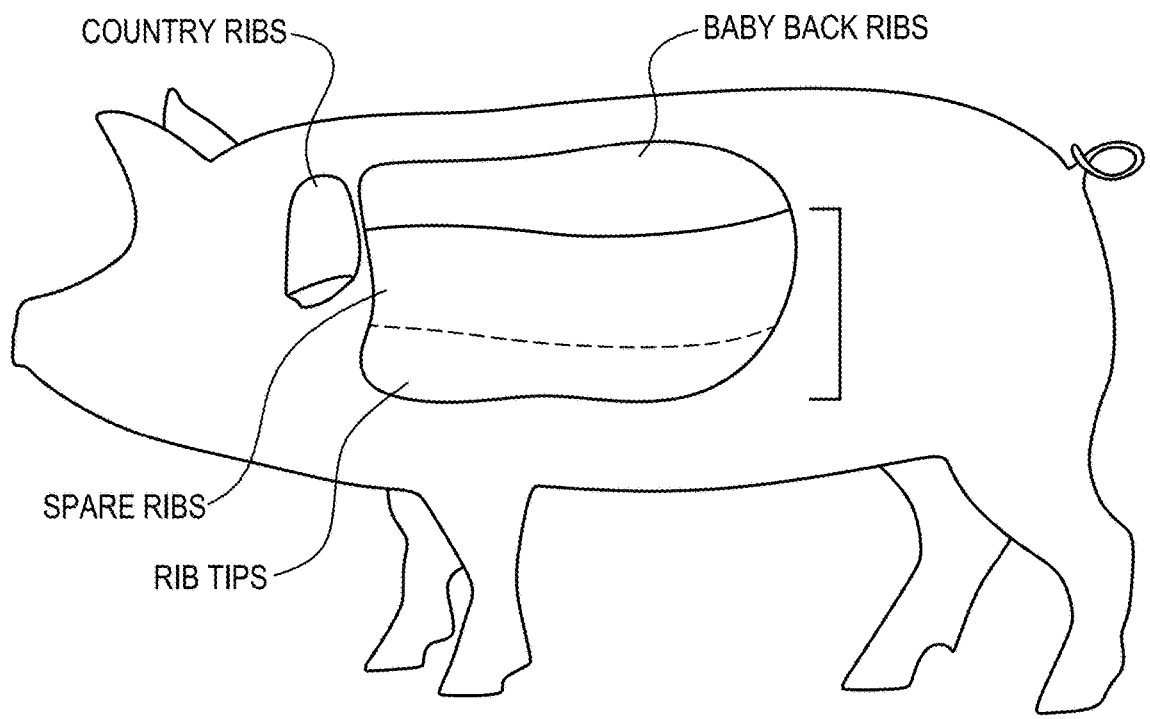
FIG. 1 is a schematic view of a hog wherein the location of the various types of ribs is schematically indicated.

The description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "top," "bottom," "right hand," "left hand," "in," "out," "extended," "advanced," "retracted," "proximal," and "distal." These references and other similar references in the present application are only to assist in helping describe and understand the present disclosure and are not intended to limit the present invention to these directions.

The present application may include modifiers such as the words "generally," "approximately," "about", or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out.

In the following description, various embodiments of the present disclosure are described. In the following description and in the accompanying drawings, the corresponding systems assemblies, apparatus and units may be identified by the same part number, but with an alpha suffix. The descriptions of the parts/components of such systems assemblies, apparatus, and units that are the same or similar are not repeated so as to avoid redundancy in the present application.

In the present application, references to "food," "food products," "food pieces," and "food items," are used interchangeably. Also, reference to primal cuts and sub primal cuts are meant to be relative terms with respect to the beef, pork, lamb, goat or other quadruped animal food items. A sub primal cut is merely meant to be derived from a primal cut by cutting, portioning, or trimming. Further reference to primal is to be interpreted to include primal cut, and reference to sub primal to be interpreted to include sub primal cut.

System Summary

Figure 3:
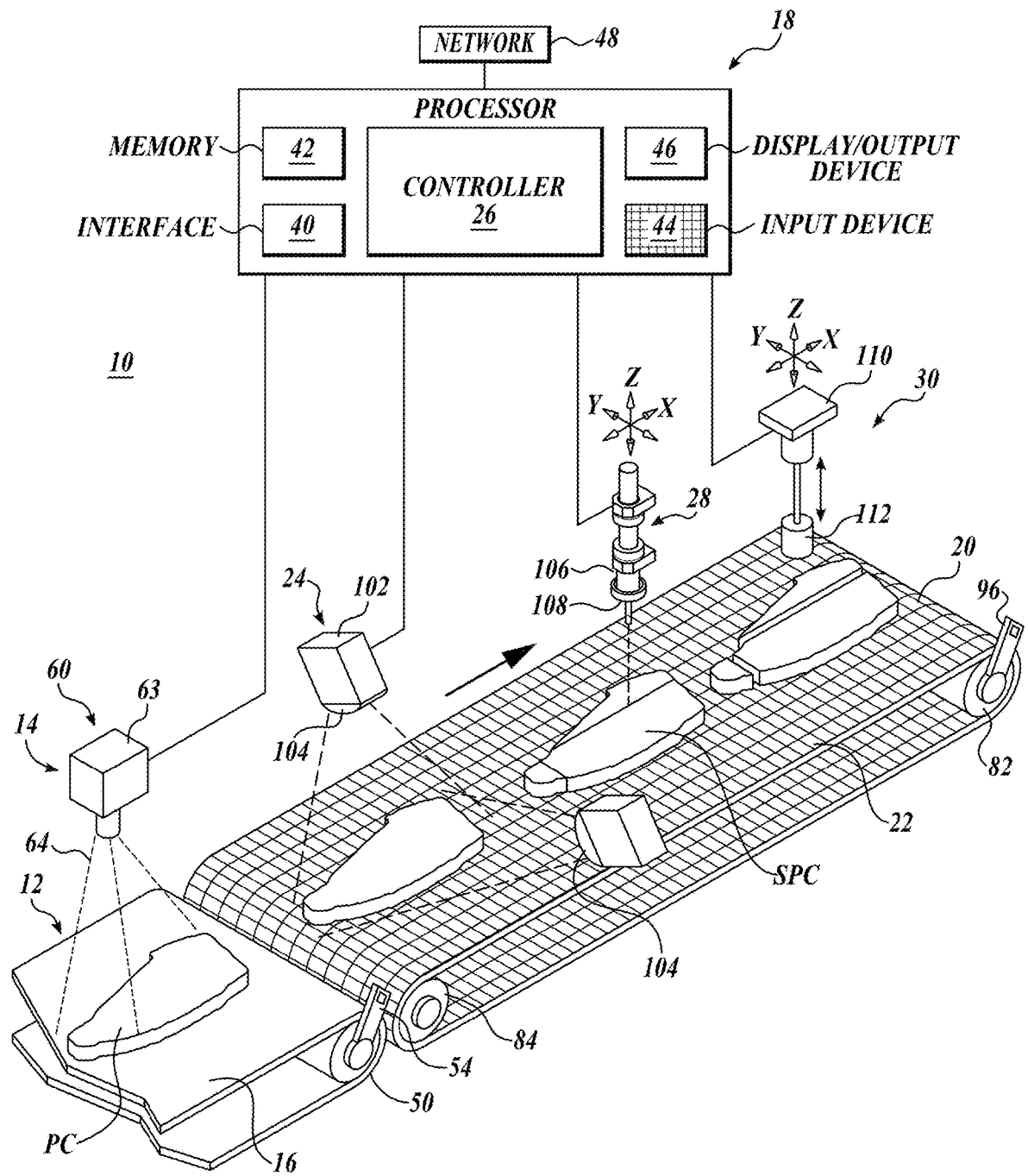
FIG. 3 is a schematic view of the portioning/trimming system of the present disclosure.

An embodiment of the processing system 10 of the present disclosure is illustrated in FIG. 3 as including, in basic form, a first upstream conveyor 12 for carrying work products, such as food products in the form of the ribcage of a slaughtered animal or in the form of primal cuts (PC) from the ribcage, past an X-ray scanning station 14 while being transported on a conveyor belt 16 that is pervious to X-rays submitted at the scanning station. The ribcage, or primal cuts thereof, have embedded bones, ribs, and cartilage that are not visible to the eye.

The primal cuts are inspected at the scanning station 14 to ascertain physical parameters of the primal including the size and/or shape of the primal cuts, physical parameters pertaining to the bone array embedded in the primal cut. Such size and/or shape parameters may include, among other parameters, the length, width, aspect ratio, thickness, thickness profile, contour, outer contour, outer perimeter, outer perimeter configuration, outer perimeter size, outer perimeter shape, volume and/or weight of the primal cut. With respect to the physical parameters of the length, width, length/width aspect ratio, and thickness of the primal cuts, such physical parameters may include the maximum, average, mean, and/or medium values of such parameters. With respect to the thickness profile of the primal cut, such profile can be along the length of the primal cut, across the width of the primal cut, as well as both across/along the width and length of the primal cut.

The parameters pertaining to the bone/rib array or arrays embedded in the primal cut include, for example, a number and location of the ribs of the rib array, as well as the size and shape of the ribs. With respect to size, specific parameters including, without limitation, the length, width, thickness and condition of the ribs. Other physical parameters of interest of the primal cut include the location, size and shape of cartilage and gristle present on the primal cut.

As noted above, a further parameter of the primal cut that may be ascertained, measured, analyzed, etc., is the contour of the primal cut. The term contour may refer to the outline, shape, and/or form of the primal cut, whether at the base or bottom of the primal cut or at any height along the thickness of the primal cut. The parameter term "outer contour" may refer to the outline, shape, form, etc., of the primal cut along its outermost boundary or edge.

The parameter referred to as the "perimeter" of the primal cut refers to the boundary or distance around a primal cut. Thus, the terms outer perimeter, outer perimeter configuration, outer perimeter size, and outer perimeter shape pertain to the distance around, the configuration, the size and the shape of the outermost boundary or edge of the primal cut.

The foregoing enumerated size and/or shape parameters are not intended to be limiting or inclusive. Other size and/or shape parameters may be ascertained, monitored, measured, etc., by the present system and method. Moreover, the definitions or explanations of the above specific size and/or shape parameters discussed above are not meant to be limiting or inclusive.

The results of the scanning occurring at station 14 are transmitted to a processor 18 as a first data set. This information can be used by the processor to determine physical parameters of the primal cut PC, including the physical parameters noted above. The processor may also be used to model the primal cut with respect to the above noted parameters, as well as the locations, sizes, shapes, number of bones or ribs in the primal cut. It is to be appreciated that the modeling of the primal cut can be a two-dimensional model or a three dimensional model.

The processor also determines how to portion and/or trim the primal cut to meet desired criteria of the resulting sub primal cuts (SPC). Such criteria include desired physical characteristics of the sub primal cuts. Such desired physical characteristics may correspond to types of sub primal cuts. For example, established types of sub primal cuts for pork may include spare ribs, St. Louis style ribs, Kansas City style ribs, baby back ribs, and country style ribs.

Other desired physical characteristics of the sub primal cuts SPC may include the weight, size, shape, length, width, thickness, flatness, fat content, cartilage content of the sub primal cut.

Further desired criteria for the sub primal cuts may be based on production requirements. Such production requirements may include the total number of sub primal cuts needed, the total number of each type of sub primal cut needed, the total weight of the sub primal cuts needed, the total weight of each type of sub primal cut needed, the weight of the sub primal cut, the length of the sub primal cut, the width of the sub primal cut, the thickness of the sub primal cut.

Production requirements may include a plurality of acceptable sub primal cuts to be portioned from a primal cut. The processor functions to monitor the production of the acceptable sub primal cuts to be harvested from the primal cuts and selects the specific sub primal cuts to be harvested from the primal cut depending on the extent to which the product production requirements for the various sub primal cuts are being met.

After the primal cut has been scanned at station 14, it is transferred to a second conveyor 20 located downstream of the first conveyor 16. The second conveyor 20 includes a belt 22 of a grid or open construction. An optical scanning station 24 is located along conveyor 20 to ascertain physical parameters of the primal cut after transfer to the second conveyor, including, for example, the physical parameters pertaining to the location, size and/or shape of the primal cut as identified above in the discussion of scanning the primal cut at the X-ray scanning station 14.

The results of the optical scanning occurring at station 24 are transmitted to the processor 18 as a second data set. The processor 18 analyzes the data from the X-ray scanning station 14 and the optical scanning station 24 first to confirm that the primal cut scanned at station 24 is the same as the primal cut previously scanned at station 14. Once this identity is confirmed, then if there has been any significant movement or shifting of the primal cut during the transfer from the first conveyor to the second conveyor, or any significant distortion of the shape of the primal cut, the applicable information or data from the X-ray scanner is translated (also referred to as "transformed") by the processor onto the corresponding data generated by the optical scanner. Such translation may include one or more of: shifting of the primal cut in the X and/or Y direction; rotation of the primal cut; scaling of the size of the primal cut; and shear distortion of the primal cut, as more fully discussed below.

Thereafter, the location of the bones/ribs within the primal cut as ascertained (mapped) from the primal cut scanned at the X-ray station 14 is translated onto the primal cut as scanned by optical scanner 24.

The primal cut is portioned and/or trimmed at cutting station 28 using one or more cutters controlled by a controller 26 operating under instructions from processor 18.

Thereafter, at transfer station 30, either the resulting sub primal cut(s) (or the trim from the primal) is transferred to a takeaway conveyor, storage bin or other location, not shown. This can be accomplished automatically as illustrated, or manually. If needed, some manual cutting or processing to the sub primal can take place, for example cutting or removing trim, fat, cartilage, etc. from the sub primal. As a further option, the sub-primal may be rescanned after the primal cut is portioned or trimmed, to verify that the cutting or trimming has occurred in the manner expected. If not, remedial action can be taken on the sub primals in question.

Processor

Next, describing the foregoing components/aspects of the processing system 10 in more detail, as schematically shown in FIG. 3, the processor 18 includes an interface 40 for receiving signals and information from scanning stations 14 and 24 and from other data sources of system 10, as described more fully below. A memory unit 42 is provided for storing information regarding the processing system 10. A keyboard or other input device 44 is provided to enable an operator to communicate with the processor 18. Also, a display or other output device 46 is provided to convey information from the processor to the operator, including the functioning of the processing system 10. The processor 18 also includes a controller 26, which may be in the form of a programmable logic controller or other type of controller, for controlling the operation of the system 10, including the conveyors 16 and 20, the X-ray scanning station 14, the optical scanning station 24, the cutter station 28, and the pickup station 30. The processor 18 can be connected to a network 48. Also, rather than employing a local processor 18, a network computing system can be used for this purpose.

Conveyor

Referring to FIG. 3, conveyor 12, as noted above, includes an X-ray permeable endless belt 16 that is trained over an end roller 50. The endless belt 16 can be powered in a conventional manner. An optional encoder 54 can be associated with the end roller 50 to monitor the location or position of the belt 16 along the length of the conveyor 12.

As noted above, the conveyor belt 16 is made from material that is permeable to X-rays, such as rubber, plastic, or a combination of both. Because of this construction, X-rays easily pass through the conveyor belt to impinge upon a detector (not shown) located beneath the upper run of the conveyor belt 16.

The system 10 is not limited to the use of conveyor 12 for moving the primal cuts either continuously or intermittently. In this regard, the conveyor 12 can be replaced with moving platforms for carrying the primal cuts or other conveyance mechanisms. In these alternative embodiments, the X-ray scanning station 14 may be arranged so that the X-rays are directed at the primal cuts in a horizontal direction rather than vertically as depicted in FIG. 3.

X-Ray Scanning

At X-ray scanning station 14, an X-ray scanning system 60 is used to inspect the primal cuts to determine the physical parameters of the primal cut, as well as the number of, locations, sizes, shapes, condition (for example, whether in tack or broken or cracked) of the ribs or other bones embedded within the primal cut. The X-ray system 60 is schematically shown in FIG. 3.

Generally, X-rays are attenuated as they pass through an object in proportion to the total mass of the material through which the X-rays pass. The intensity of the X-rays received at an X-ray detector, after they have passed through an object such as primal cut is therefore inversely proportional to the density of the object. For example, X-rays passing through a pork or rib bone, which have a relatively higher density than the pork flesh, will be more attenuated than the X-rays that pass only through the meat of the pork. Thus, X-rays are suited for inspecting primal cuts to detect the existence of bones, ribs, cartilage having specific density or X-ray modification characteristics. A general description of the nature and use of X-rays in processing primal cuts can be found in U.S. Pat. No. 5,585,603, incorporated herein by reference.

Figure 4:
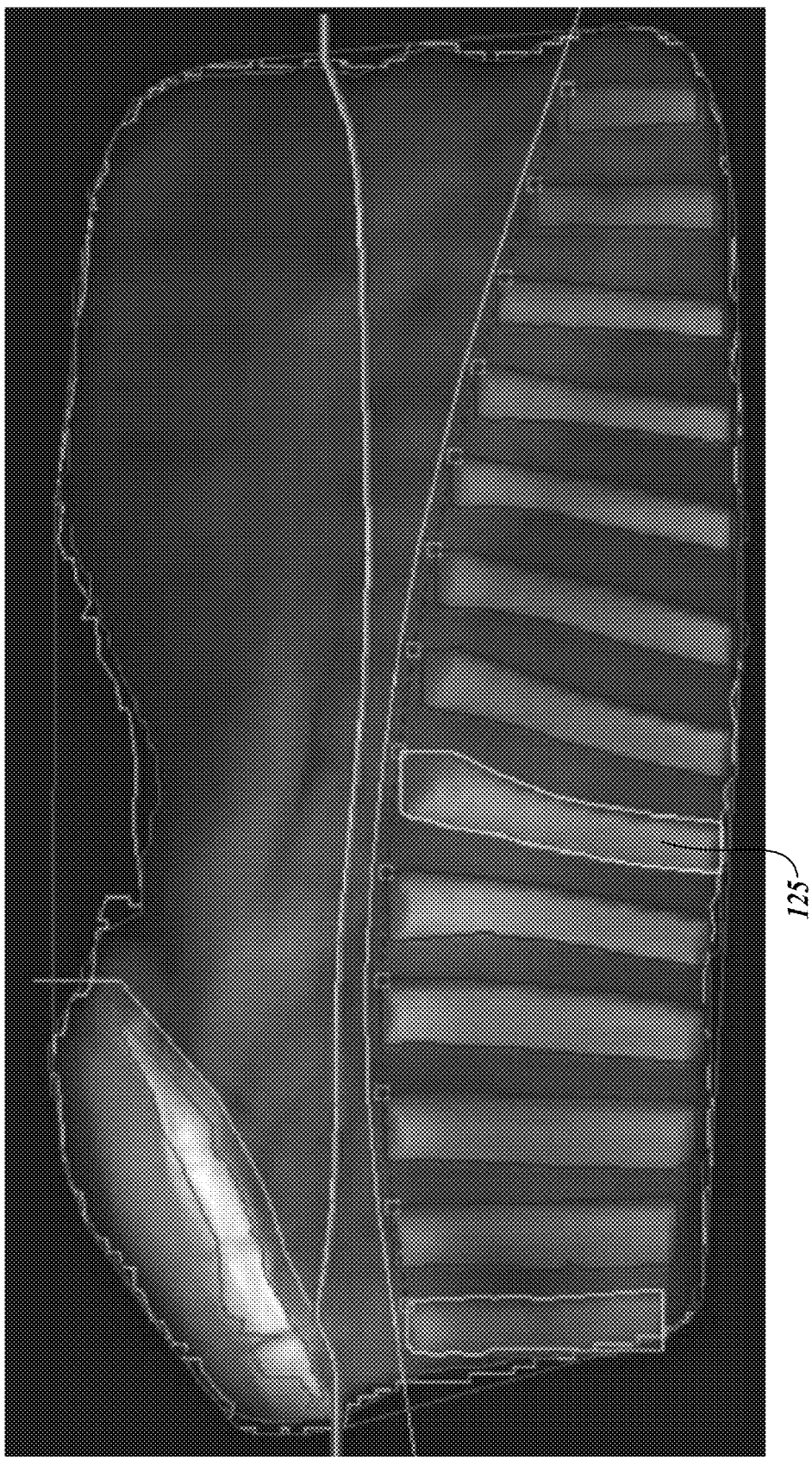
FIG. 4 is an X-ray of a spare rib rack illustrating the location of the ribs as well as a possible strategy for trimming to achieve a St. Louis style rack.

Referring to FIG. 3, the X-ray scanning system 60 includes an X-ray source 63 for emitting X-rays 64 toward a primal cut PC. An array of X-ray detectors (not shown) is located adjacent and beneath the upper run of conveyor belt 16 for receiving the X-rays 64 that have passed through the primal cut when the primal cut is within the scope of the X-rays 64. Each of the X-ray detectors in the array generates a signal corresponding to an intensity of the X-rays impinging on the X-ray detector. The signals generated by the X-ray detector array are transmitted to processor 18. The processor processes these signals to determine the existence, location, numbers of, sizes, shapes, condition of, etc., of ribs or other bones present in the primal cut as well as other physical parameters of the primal cut. In this regard, see FIGS. 4 and 5 wherein the rib arrays of two different spare rib sub primal racks are shown in X-ray images.

The system 10 may include a position sensor in the form of encoder 54 that generates the signal indicative of the position of the primal cut along the length of conveyor 12 as the primal cut is moved on the conveyor with respect to the X-ray station 14. The position of the primal cut along the length and width of the conveyor 12 can be ascertained by the X-ray system. As noted above, the X-ray system can also provide other information with respect to a primal cut, including physical parameters pertaining to the size and/or shape of the primal cut, including for example, the length, width, aspect ratio, thickness, thickness profile, contour, outer contour configuration, perimeter, outer perimeter configuration, outer perimeter size and/or shape, volume and/or weight, as well as other aspects of the physical parameters of the primal cut. With respect to the outer perimeter configuration of the primal cut, the X-ray detector system can provide data to help determine locations along the outer perimeter of the primal cut based on an X-Y coordinate system or other coordinate system.

Other embodiments of the X-ray scanner system 60 may be utilized, which are also capable of detecting the intensity (or attenuation) of the X-rays that have passed through the primal cut to determine the physical parameters of the ribs within the primal cut. For example, an alternative embodiment of an X-ray detector system 60 may include a fluoroscope screen and a video camera. When the X-rays 64 impinge on the fluoroscope screen, the screen is activated to produce light flashes in proportion to the attenuation of the impinging X-rays. The light flashes are then recorded by the video camera, or other device capable of capturing the "picture" produced by the fluoroscope screen. The image captured by the video camera is then transmitted to processor 18, and converted into digital values related to the intensity of the light generated by the fluoroscope screen.

Further alternatively, direct flat panel X-ray imaging technology or direct radiography may be used. For example, an array of amorphous selenium detectors may be used as an X-ray detector to directly detect the intensity of the impinging X-rays, and to transmit the intensity to the processor 18.

Other X-ray option include the use of dual-energy x-ray source or a photon-counting, multi-bin X-ray system.

Further, other types of scanners may be employed, for example infrared scanning, sonar/ultra sound scanning, CT scanning or MRI scanning Control System As noted above, the data from X-ray scanning at station 14 is utilized by processor 18 to physically characterize the primal cut. In this regard, the processor is able to model the primal cut as well as provide dimensional information with respect to the length, width, aspect ratio, thickness, thickness profile, contour, outer contour configuration, perimeter, outer perimeter configuration, outer perimeter size and/or shape, volume, and/or weight of the primal cut. The weight of the primal cut is based on an assumed density of the primal cut. The processor 18 also provides information as to the location of the primal cut on the conveyor 12, as well as the orientation of the primal cut relative to the longitudinal direction of the travel of conveyor 12. The processor 18, utilizing the first data set from the X-ray station 14, is also able to determine and model the existence, locations, numbers, sizes, shapes, condition of ribs or other bones present in the primal cut.

The processor 18 utilizes the above information regarding the primal cut PC to determine how to trim/portion the primal cut into desired sub primal cuts SPC. This determination is made based on desired physical characteristics of the sub primal cuts as well as production requirements of the sub primal cuts. The desired physical characteristics of the sub primal cuts can be of various types, for example, it may be desirable to portion the primal cut into sub primal cuts of established types, for example, for a pork ribcage primal cut, established types of sub primal cuts include spare ribs, whether a full rack or divided into sub racks, see FIG. 1 above. Established sub primal cuts from a spare rib rack include St. Louis style spare ribs, described above, as well as Kansas City style spare ribs, which include more of the rib tip than in a St. Louis style spare rib. Other established types of sub primal cuts from a pork ribcage include baby back ribs, whether configured as a full rack or as a part of a rack, i.e., a sub rack. A further type of established sub primal cut from a pork ribcage includes country style ribs, which do not include embedded ribs per se, but rather include embedded sections of the shoulder blade. A further established sub primal cut from a pork ribcage includes the brisket and/or rib tips which are the portion of the ribcage extending from the spare ribs distal to the vertebra. The brisket typically includes embedded hard cartilage which is difficult to visually locate but can be readily detected by X-ray scanning The specifications for the foregoing established sub primal cuts for pork are set forth in the United States Department of Agriculture ("USDA") publication "Institutional Meat Purchase Specifications: Fresh Pork: Series 400", dated November 2014. This publication is incorporated herein by reference. This USDA publication specifies the following pork sub primals:

Item No. 416—Pork Spareribs—Spareribs shall contain at least 11 ribs and associated costal cartilages and may include portions of the sternum and diaphragm. The membranous portion of the diaphragm must be removed close to the lean. Any portion of the diaphragm not firmly attached shall be removed close to the inside surface of the ribs. The lean shall not extend more than 2.0 inches (5.0 cm) past the curvature of the last rib and costal cartilage. Heart fat on the inside surface of the ribs shall not exceed ¼-inch (6 mm) average depth. Leaf fat shall be trimmed practically free from the diaphragm and M. transverse abdominis. This item may also be referred to as "Side Ribs". Purchaser may specify number of ribs.

Item No. 416A—Pork Spareribs, St. Louis Style—The spareribs shall be as described in Item No. 416 except the sternum and the ventral portion of the costal cartilages shall be removed along with the flank portion. The breast shall be removed at a point which is dorsal to the curvature of the costal cartilages. When specified, the diaphragm shall be removed, and the spareribs shall be separated into two approximate equal portions by a lengthwise cut. This item may also be referred to as "Side Ribs, Center-Cut"

Item No. 416B—Pork Spareribs, Brisket Bones—This item consists of the sternum, costal cartilages and attached lean which have been removed from Item No. 416A. This item may also be referred to as "Rib Tips".

Item No. 422—Pork Loin, Back Ribs—The back ribs shall consist of at least eight (8) ribs and related M. intercostal from a loin. The back rib sections shall be intact, and the bodies of the thoracic vertebrae shall be removed except that small portions of the vertebrae may remain between the rib ends. When specified, the "skin" (peritoneum) shall be removed from the inside surface of the ribs and M. intercostal. This item may also be referred to as "Baby Back Ribs". Purchaser may specify number of ribs.

Item No. 424—Pork Loin, Riblet—This item is derived from the transverse processes and associated lean from the lumbar vertebrae of any IMPS bone in pork loin after removal of the tenderloin and the loineye. Riblets shall; contain no less than 4 transverse processes (sometimes referred to as "paddle" or "finger" bones); be held intact by associated lean; and include no more than two rib bones. This item shall be trimmed practically free of surface fat. Purchaser may specify number of bones.

Sub primal cuts from the beef ribcage primal are also defined by the U.S. Department of Agriculture in its publication titled Institutional Meat Purchase Specifications: Fresh Beef, Series 100, November 2014. This publication is incorporated herein by reference. Established sub primals pertaining to the beef ribs are set forth below:

Item No. 103—Beef Rib, Primal—The primal rib is that portion of the forequarter remaining after removal of the cross-cut chuck and short plate and shall contain seven ribs (6th to 12th inclusive), the posterior tip of the blade bone (scapula), and the thoracic vertebra attached to the ribs. The loin end shall follow the natural curvature of the 12th rib. The chuck is removed by a straight cut between the 5th and 6th ribs. The short plate shall be removed by a straight cut which is ventral to, but not more than 6.0 inches (15.0 cm) from, the M. longissimus dorsi at the loin end to a point on the chuck end ventral to, but not more than 10.0 inches (25.4 cm) from, the M. longissimus dorsi. The diaphragm and fat on the ventral surface of the vertebrae shall be removed.

Item No. 103A—Beef Rib, Regular—This item is prepared as described in Item No. 103 except that the short plate shall be removed by a straight cut which is ventral to, but not more than 3.0 inches (7.5 cm) from the M. longissimus dorsi at the loin end to a point on the chuck end ventral to, but not more than 4.0 inches (10.0 cm) from, the M. longissimus dorsi. The protruding edge of the chine bone shall be removed.

Item No. 104—Beef Rib, Oven-Prepared, Regular—The oven prepared rib is as described in Item No. 103 except that the short plate shall be removed by a straight cut which is ventral to, but not more than 4.0 inches (10.0 cm) from, the M. longissimus dorsi at the loin end to a point on the chuck end ventral to, but not more than 8.0 inches (20.0 cm) from, the M. longissimus dorsi. The chine bone shall be removed such that the lean is exposed between the ribs and the feather bone/vertebrae junctures, leaving the feather bones attached. The blade bone and related cartilage shall be removed.

Item No. 107—Beef Rib, Oven-Prepared—This item is prepared as described in Item No. 103 except that the short plate shall be removed by a straight cut which is ventral to, but not more than 3.0 inches (7.5 cm) from the M. longissimus dorsi at the loin end to a point on the chuck end ventral to, but not more than 4.0 inches (10.0 cm) from, the M. longissimus dorsi. The chine bone shall be removed such that the lean is exposed between the ribs and the feather bone/vertebrae junctures, leaving the feather bones attached. The blade bone and related cartilage shall be removed.

Item No. 107 A—Beef Rib, Oven-Prepared, Blade Bone In—This item is as described in Item No. 107 except that the blade bone and related cartilage may remain Item No. 109—Beef Rib, Roast-Ready—This item is prepared as described in Item No. 103 except that the short plate shall be removed by a straight cut that is ventral to, but not more than 3.0 inches (7.5 cm) from, the M. longissimus dorsi at the loin end to a point on the chuck end ventral to, but not more than 4.0 inches (10.0 cm) from, the M. longissimus dorsi. The chine bone shall be removed such that the lean is exposed between the ribs and the feather bone/vertebrae junctures, leaving the feather bones attached. The blade bone and related cartilage, backstrap, M. latissimus dorsi, M. infraspinatus, M. subscapularis, M. rhomboideus, and M. trapezius shall be removed. The exterior fat covering (that covered the M. latissimus dorsi and M. trapezius) shall not exceed 1.0 inch (25 mm) in depth at any point. The fat cover may be separated to accommodate removal of the backstrap and returned to its original position. The fat cover shall be trimmed even with the short plate side and shall not have holes larger than 2.0 square inches (12.9 sq. cm). The rib shall be netted or tied when specified.

Item No. 109A—Beef Rib, Roast-Ready, Special—This item is as described in Item No. 109 except that feather bones are removed. The exterior fat covering (that covered the M. latissimus dorsi, M. trapezius, M. longissimus dorsi, and M. spinalis dorsi) shall be separated to facilitate trimming of the underlying fat. The underlying fat covering the M. longissimus dorsi and M. spinalis dorsi shall be trimmed to a uniform thickness for the entire seamed surface. The exterior fat covering shall be returned and positioned so that it extends from the edge of the rib bones where the feather bones were, toward the edges of the rib bones at the short plate side. Fat cover extending beyond the short plate edges of the ribs shall be removed. The fat cover shall not exceed 1.0 inch (25 mm) in thickness at any point and shall not have holes larger than 2.0 square inches (12.9 sq. cm).

Item No. 109C—Beef Rib, Roast-Ready, Cover Off—This item is prepared as described in Item No. 109A except that the fat cover shall be excluded.

Item No. 109D—Beef Rib, Roast-Ready, Cover Off, Short Cut (Export Style)—This item is as described in Item 109A except that the fat cover shall be removed and the short plate shall be removed by a straight cut which is ventral to, but not more than 2.0 inches (5.0 cm) from, the M. longissimus dorsi at the loin end to a point on the chuck end ventral to, but not more than 3.0 inches (7.5 cm) from, the M. longissimus dorsi.

Item No. 109E—Beef Rib, Ribeye Roll, Lip-On, Bone In (Export Style)—This item is as described in Item 109D except that the short plate shall be removed by a straight cut which is ventral to, but not more than 2.0 inches (5.0 cm) from the M. longissimus dorsi. The PSO's for short plate removal are as follows:

| Option No. | Description |
|---|---|
| 1 | 1.0 in. (25 mm) × 1.0 in. (25 mm) |
| 2 | 0 in. × 0 in. (product name shall omit reference to "lip-on") |
| 3 | Other |

Item No. 110—Beef Rib, Roast-Ready, Boneless—This item is as described in Item No. 108 except that the M. latissimus dorsi, M. infraspinatus, M. subscapularis, M. rhomboideus, and M. trapezius, shall be removed. The exterior fat covering which covered the M. latissimus dorsi and M. trapezius shall be left intact. Fat cover extending beyond the short plate edge shall be removed. The roast shall be netted or tied. Purchaser may specify lip length (short plate) removal.

Item No. 111—Beef Rib, Spencer Roll—This item is as described in Item No. 108 except that the muscles (M. latissimus dorsi and M. trapezius) and fat cover overlying the blade pocket shall be removed. The short plate shall be removed by a straight cut that is ventral to, but not more than 2.0 inches (5.0 cm) from, the M. longissimus dorsi at the loin end to a point on the chuck end ventral to, but not more than 1.0 inch (25 mm) from, the M. longissimus dorsi.

Established types of sub primal cuts of lamb from the rib carriage are set forth in the U.S. Department of Agriculture publication Institutional Meat Purchase Specifications: Fresh Lamb, Series 200, November 2014. This publication is incorporated herein by reference. The primals and sub primals pertaining to the lamb rib carriage is set forth below:

Item No. 203—Bracelet—The bracelet consists of the rack and breast from both sides of the carcass attached. It is separated from the shoulder as described in separation a, and from the loin in separation b.

When style is not specified by the purchaser, the separations a and b for Style A shall be followed.

Item No. 204—Rack—The rib rack is as described in Item No. 203 except that the breast shall be removed. The breast shall be removed from the bracelet by a straight cut across the ribs which is not more than 4.0 inches (10.0 cm) from the ventral edge of the longissimus dorsi. The diaphragm and fat on the ventral surface of the vertebrae shall be removed. Unless otherwise specified, the rack is often packaged split. This unsplit rack is often referred to as a "hotel rack".

Item No. 204A—Rack, Chined—This item is as described in Item No. 203 except the rack shall be split and the breast shall be removed by a straight cut across the ribs which is not more than 4.0 inches (10.0 cm) from the ventral edge of the longissimus dorsi. The chine bones shall be removed such that the lean is exposed between the ribs and the feather bones, leaving the feather bones attached.

| Option No. | Description |
|---|---|
| 1 | Purchaser may specify a % rack (4 rib rack) for this item |

Item No. 204B—Rack, Roast Ready—This item is as described in Item No. 204A except that the breast side of the ribs shall be removed by a straight cut across the ribs which is not more than the PSO from the ventral edge of the longissimus dorsi. Additionally, feather bones, exterior fat cover, backstrap, blade bone and the trapezius, infraspinatus, and latissimus dorsi shall be removed, making the item partially cap-off. The purchaser may specify one of the following tail length options for Item No. 2048.

If not specified, tail length will not be more than 4.0 inches (10 cm) from the ventral edge of the longissimus dorsi or as specified within the item description.

The term block-ready is used interchangeably with roast-ready when describing this item.

| Option No. | Description |
|---|---|
| 1 | 3 in. (7.5 cm) |
| 2 | 2 in. (5 m) |
| 3 | 1 in. (2.5 mm) |
| 4 | 0 in (0 mm) |
| 5 | Purchaser may specify a % rack (4 rib rack) for this item |
| 6 | In addition, the rhomboideus and subscapularis muscles below the blade bone shall be removed, making the item cap off. |

Item No. 204C—Rack, Roast Ready, Cap On, Frenched—This item is as described in Item No. 204A and is further prepared by removing the blade bone and associated cartilage, and by removing the feather bones. In addition, the breast side of the ribs shall be trenched (removal of the intercostal meat and lean and fat over the ribs). Exposed portions of rib bones shall not exceed 2 inches (5.0 cm) in length and the remaining intercostal meat and lean and fat over the rib bones shall not exceed 2.0 inches (5.0 cm) from the ventral edge of the longissimus dorsi muscle.

The term block-ready is used interchangeably with roast-ready when describing this item.

| Option No. | Description |
|---|---|
| 1 | The length from the ventral edge of the longissimus dorsi to the point at which the breast is removed shall be no more than 3 inches (7.5 cm), and neither the exposed rib bone nor the remaining intercostal meat, lean, and fat over the rib bones shall exceed 1.5 inches (3.8 cm) in length. |
| 2 | Purchaser may specify a % rack (4 rib rack) for this item. |
| 3 | The intercostal meat and lean and fat over the rib bones shall be removed (trenched) to the base of the loin eye. |
| 4 | The muscles above where the blade bone was (trapezius, infraspinatus, and latissimus dorsi) are removed. |
| 5 | Purchaser may specify an alternative length for the remaining intercostal meat/French. |

Item No. 204D—Rack, Roast Ready, Cap Off, Frenched—This item is as described in Item No. 2048 PSO 6, which has the cap fully removed. In addition, the breast side of the ribs shall be trenched (removal of the intercostal meat and lean and fat over the ribs). Exposed portions of rib bones shall not exceed 2 inches (5.0 cm) in length and the remaining intercostal meat and lean and fat over the rib bones shall not exceed 2.0 inches (5.0 cm) from the ventral edge of the longissimus dorsi muscle. The term "Block-Ready" is used interchangeably with "Roast-Ready" when describing this item.

| Option No. | Description |
|---|---|
| 1 | The length from the ventral edge of the longissimus dorsi to the point at which the breast is removed shall be no more than 3 inches (7.5 cm), and neither the exposed rib bone nor the remaining intercostal meat, lean, and fat over the rib bones shall exceed 1.5 inches (3.8 cm) in length. |
| 2 | Purchaser may specify a % rack (4 rib rack) for this item. |
| 3 | The intercostal meat and lean and fat over the rib bones shall be removed (trenched) to the base of the loin eye. |
| 4 | Purchaser may specify an alternative length for the remaining intercostal meat/French. |

Item No. 209—Breast—This item is derived from anterior portion of the carcass remaining after 'Separation B'. The rack (Item No. 204) and square-cut shoulder (Item No. 207) shall be removed leaving the ribs and sternum (brisket) portions intact by a straight cut that passes through the cartilaginous juncture of the first rib and sternum and a point that is not more than 4 inches ventral to the longissimus on the posterior (rack) end. The foreshank (Item No. 210) shall be removed by cutting through the natural seam and pectoralis superficialis. The diaphragm may be removed. However, if present, the membranous portion of the diaphragm shall be trimmed close to the lean. The heart fat shall be closely removed.

| Option No. | Description |
|---|---|
| 1 | When specified by the purchaser, the breast bones and associated rib bones (brisket) are removed during the shoulder/bracelet break (Separation B) by a straight cut between the 4th and 5th ribs (Cutting Style A) or 5th and 5th ribs (Cutting Style B). PSO 1 is the more common specification for this item. |

Item No. 209A—Ribs, Breast Bones Off—This item is prepared from Item No. 209 and shall consist of at least 7 ribs, and the intercostal muscles, serratus ventralis, and associated muscles immediately overlying the ribs. The cut shall be not less than 3.0 inches (7.5 cm) in width. The sternum and ventral edges of the costal cartilages shall be removed. The fell, cutaneous trunci, exterior fat cover, latissimus dorsi, and diaphragm shall be removed. This item shall be trimmed practically free of surface fat. This item is sometimes referred to as "Denver Style Ribs".

| Option No. | Description |
|---|---|
| 1 | Notched/Split: When specified, notching of lamb ribs shall be accomplished by making saw cuts across the ribs at 1.0 inch (2.5 cm) intervals. The saw cuts shall pass through the rib bones |

| Option No. | Description |
|---|---|
| | and intercostal meat while leaving the lean (serratus ventralis) intact. |
| 2 | Special/Frenched: When specified, the ribs shall be trenched. Prior to trenching the costal cartilages shall be removed by a straight cut parallel with the dorsal edge. The ribs will then be trenched by detaching the serratus ventralis and removing the intercostal meat from the rib bones for a distance of 2 inches (5 cm) from the ventral (sternum/costal cartilage) side. The serratus ventralis shall be rolled and tied to the dorsal edge. |
| 3 | The ribs are cut into individual portions by slicing between the rib bones through the intercostal meat and overlying muscles. |

Item No. 209B—Shoulder, Ribs—This item may be derived from any square-cut IMPS shoulder item and shall include at least 4 ribs and the intercostal and serratus ventralis muscles. This item shall be trimmed practically free of surface fat. The dorsal edge shall have no evidence of the cartilaginous junctures of the ribs and thoracic vertebrae.

| Option No. | Description |
|---|---|
| 1 | Notched/Split: When specified, notching of lamb ribs shall be accomplished by making saw cuts across the ribs at 1.0 inch (2.5 cm) intervals. The saw cuts shall pass through the rib bones and intercostal meat while leaving the lean (serratus ventralis) intact. |
| 2 | Special/Frenched: When specified, the ribs shall be trenched. Prior to trenching the costal cartilages shall be removed by a straight cut parallel with the dorsal edge. The ribs will then be trenched by detaching the serratus ventralis and removing the intercostals meat from the rib bones for a distance of 2 inches (5 cm) from the ventral (sternum/costal cartilage) side. The serratus ventralis shall be rolled and tied to the dorsal edge. |
| 3 | The ribs are cut into individual portions by slicing between the rib bones through the intercostal meat and overlying muscles. |

Other desired designated physical characteristics of the sub primal cuts may include a weight, size, shape, length, width, thickness, flatness, fat content, and cartilage content of the sub primal cut. These desired characteristics may be based on production requirements for the sub primals. Rather than specifying a nominal target physical characteristic, the desired physical characteristic, including from production requirements, may be specified in terms of a minimum and a maximum, for example, a minimum and maximum weight, size, length, width, thickness, flatness, fat content, and/or cartilage content.

In addition to the foregoing, production requirements can be specified in terms of the total number of sub primal cuts, the total number of each type of sub primal cut, the total weight of the sub primal cuts, the total weight of each type of sub primal cut, etc.

As noted above, production requirements may specify a plurality of different acceptable sub primal cuts to be portioned from the primal. If this is the case, the different acceptable sub primal cuts may be rated according to, for instance, value to the customer/purchaser.

Figure 2:
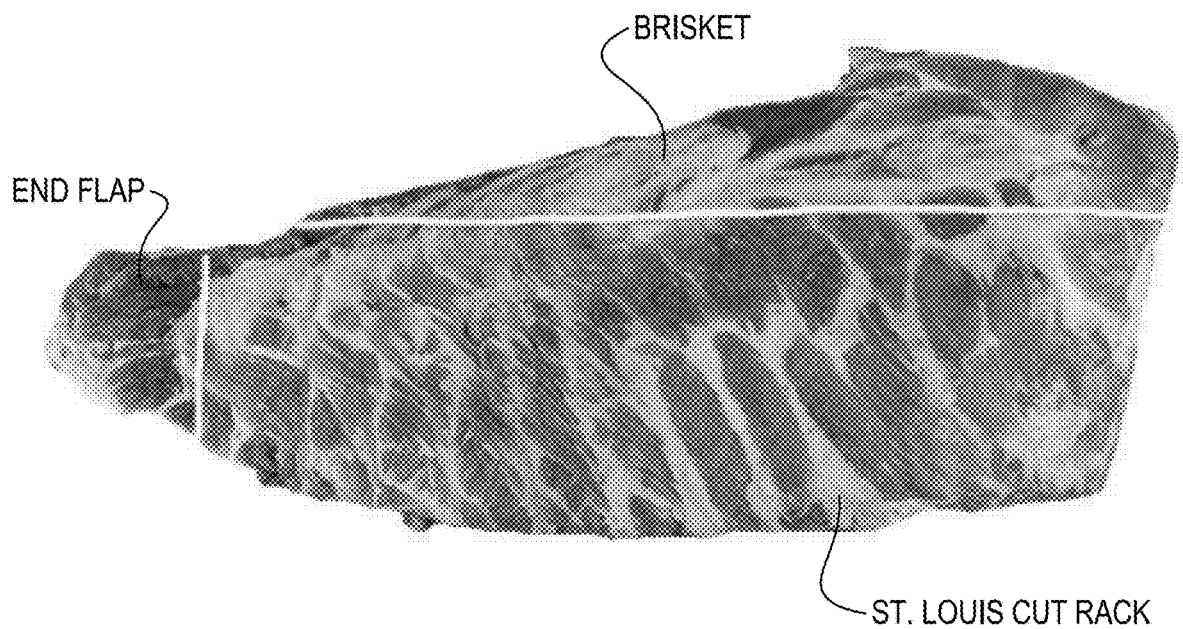
FIG. 2 is a photograph of a spare rib rack showing trim lines to produce a St. Louis style rack.

For example, with respect to the pork sub primal cuts described below, the most valuable is the St. Louis type rib rack. See FIGS. 2 and 4. However, not all spare rib racks can be trimmed into a St. Louis style rib rack because typically in a St. Louis type rib rack, maximum length of the rib is about 5.25 inches, and the minimum length of the ribs are typically in the range of 1.0 to 1.25 inches. Also, there must be a minimum of 12 ribs.

If a St. Louis style rib is not capable of being produced from a spare rib rack, a Kansas City type rib rack may be produced. A Kansas City type rib rack differs from a St. Louis type rib rack in that additional portions of the rib tip sections are used in a Kansas City type rib rack. However, the value of a Kansas City type rib rack is somewhat less than that of a St. Louis style rib rack.

If a spare rib rack cannot be trimmed into a St. Louis rib rack, the primal may be trimmed into a regular spare rib rack. In this regard, the end trim is removed as well as the brisket. However, efforts are made to include part of the rib tips.

Figure 5:
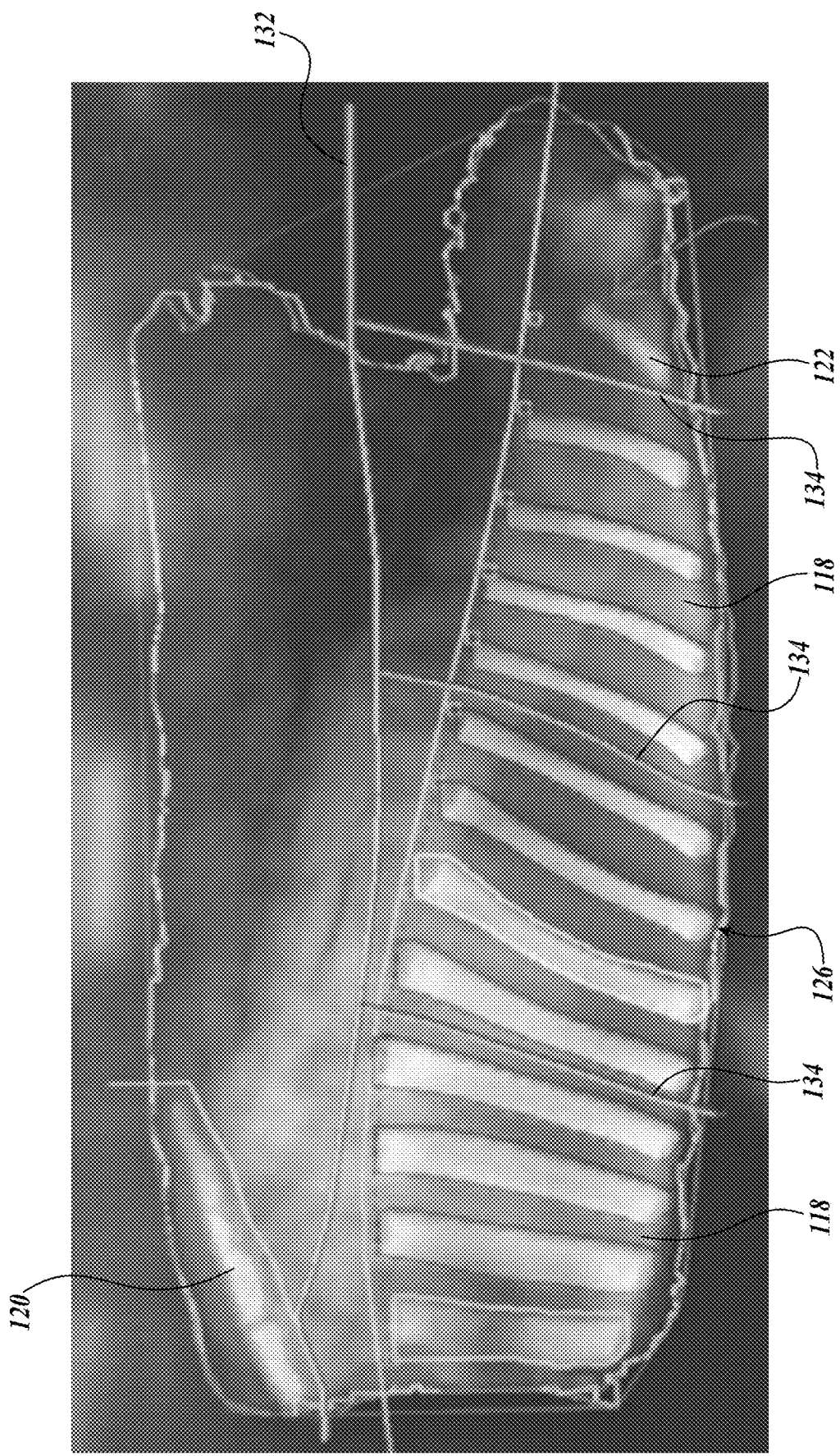
FIG. 5 is another example of an X-ray of a spare rib rack illustrating how the rack may be portioned into sub racks using the present disclosure.

Rather than trimming the primal into a regular spare rib sub primal, the primal may be portioned into spare rib sub racks having from, for example, one to four ribs per sub rack. FIG. 5 illustrates the portioning of the sub primal cut 116 into three spare rib sub racks 118 of four ribs each. In the example of FIG. 5, the sixth rib from the left, designated by the reference number 125, was considered to be too long to enable the spare rib rack to be trimmed into a St. Louis rib rack. The portioning of the spare rib rack in FIG. 5 occurs along the longitudinal cut line 132 and intersection transvers cut lines 134. In this regard, the longitudinal cut line 132 extends just below the brisket cartilage 126 and extends beyond the ends of the ribs at both the far left and far right of the rack. Also, the small first rib 122 at the far right is trimmed off.

Rather than creating sub racks of the four ribs, FIG. 6 illustrates cutting a spare rib rack 124 with two ribs per sub rack 126. The five sub racks 126 include a significant amount of the rib tip portions 128 so as to increase the yield from the rib rack. The far left sub rack 126 is located beneath the brisket cartilage 130, and thus is shorter in length than the five sub racks to the right. The present system is able to discern the location of the ribs embedded in the rib rack 124 of FIG. 6 as well as the location of the brisket cartilage 130 to allow the control system to determine how to portion the primal are to maximize the yield from the primal cut.

It would be difficult for workers to determine the precise location of the ribs within the rib rack 124 since the bones/ribs are embedded with the flesh of the rib rack. Moreover, the rib bones are typically not entirely straight nor do the ribs always align fairly parallel to each other. Although these conditions are easily determined by the system 10 of the present disclosure, these conditions are sometimes difficult to discern by workmen having to view the rib rack from the exterior thereof.

Although the control system functions to determine how to trim and/or portion a rib primal to desired physical parameters, the control system also is able to help meet the production requirements for the sub primal cuts while maximizing the value of the sub primal cuts. In this regard, the control system is capable of monitoring of the numbers of types of sub primal cuts that have been produced from the primal cuts and then bias the determination on how to trim/portion additional primal cuts so as to achieve the required production levels of the various sub primal cuts.

For example, if the entire rack cannot be trimmed into a St. Louis rack, it may be possible to produce spare rib sub racks of four ribs, two ribs, and/or one rib. The control system can analyze the spare rib rack to determine if the rack can be divided into sub racks of four ribs each that meet specified physical parameters of the four-rib sub rack including, for example, minimum weight, minimum length, and/or minimum width. If these desired physical parameters cannot be met for a sub rack of four ribs, then the control system can analyze the spare rib rack to determine whether the rack can instead be portioned into sub racks of two ribs each, which is more desirable than sub racks of one rib each due to the value of the two rib sub rack versus the value of the one rib sub rack. As trimming and portioning of the primal cuts occurs, the control system keeps track of the number of four rib sub racks, two rib sub racks and one rib sub racks produced and is able to bias the determination on how a rack should be portioned so as to end up with the desired number of each of the different types of sub racks. The foregoing is only one example of how the control system is capable of functioning to achieve production requirements while maximizing or at least optimizing the value of the sub primals produced.

Once the primal cut PC has passed by scanning station 14, the primal cut travels to the end of the first or upstream conveyor 12 and then is transferred to the second or downstream conveyor 20. As noted above, the input end of the second conveyor 20 is located closely adjacent the output end of conveyor 12 so that primal cuts can be transferred from conveyor 12 to conveyor 20 with minimal "disruption." This means that in the transfer of the primal cut, the primal cut substantially retains its shape and location side to side on conveyor 20 as well as longitudinally with respect to the other primal cuts on the conveyors 12 and 20.

Referring to FIG. 3, belt 22 of conveyor 20 is of metallic construction configured in grid or open form so that the waterjet(s) at cutter station 28 is (are) free to pass downwardly through the belt to a collection tank or other receptacle, not shown, positioned beneath the conveyor 20. Various constructs of conveyor belts corresponding to belt 22 are described in U.S. Pat. No. 6,854,590, incorporated by reference herein.

The belt 22 is trained around a drive roller 82 as well as around idler roller 84 at the opposite ends of the conveyor. The belt 22 is composed of formed, flat wire links in a standard number. Of course, belt 22 can be of numerous other types of construction. An encoder 96 may be utilized in conjunction with conveyor 20 to generate signals or pulses at fixed intervals corresponding to the rotation of drive roller 82 or a drive shaft (not shown) coupled to the drive roller 82. This enables the locations of primal cuts moving on conveyor 20 to be known.

As noted above, optical scanning station 24 can be positioned along conveyor 20. The optical scanning at station 24 can be carried out using a variety of techniques, including with a scanner 102 to view primal cut illuminated by one or more light sources 104. The light from the light sources 104 is extended across the moving conveyor 20 to define a sharp shadow or light stripe line, with the area forward of the transverse beam being dark. When no primal cut is being carried by the conveyor, the shadow line/light stripe forms a straight line across the belt. However, when a primal cut passes across the shadow line/light stripe, the upper, irregular surface of the primal cut produces an irregular shadow line/light stripe as viewed by a video camera directed downwardly on the primal cut and the shadow line/light stripe. The video camera detects the displacement of the shadow line/light stripe from the position it would occupy if no primal cut were present on the conveyor 20. This displacement represents the thickness of the primal cut along the shadow line/light stripe.

The length of the primal cut is determined by the length of the time that the shadow lines are created by the primal cut. In this regard, encoder 96 integrated into the structure of conveyor 20 generates pulses at fixed time intervals corresponding to the forward movement of the conveyor.

The optical scanner 102 is capable of locating the primal cut on the belt 22 and thus ascertaining whether the primal cut has shifted in the X and/or Y directions relative to belt 16 after transfer onto belt 22. The scanner 102 is also able to determine whether primal cut has rotated relative to the orientation of the primal cut on belt 16 or whether the primal cut has increased or decreased in length or width or otherwise distorted in shape relative to its configuration on belt 16. The exterior configuration of the primal cut is discernable by the scanner 102, which ascertains parameters related to the size and/or shape of the primal cut (for example, length, width, aspect ratio, thickness, thickness profile, contour (both two-dimensionally and three-dimensionally), outer contour configuration; perimeter, outer perimeter configuration, outer perimeter size and/or shape, volume and/or weight, of the primal cut). With respect to the outer perimeter configuration of the primal cut, the scanner can determine discrete locations along the outer perimeter of the primal cut in terms of an X-Y coordinate system or other coordinate system. This latter information can be used by the processor to determine/verify that the primal cut being scanned at optical scanning station 24 is the same primal cut as previously scanned at the X-ray scanning station 14. For example, the processor can compare the data identifying coordinates along the outer perimeter of the primal cut as determined by scanning station 24 with the corresponding data obtained previously at X-ray scanning station 14. If the data sets match within a fixed threshold level, then confirmation is provided that the primal cut scanned at optical station 24 is the same as the primal cut previously scanned at the X-ray scanning station 14.

However, if for example, a primal cut was removed from the conveyor 12, or from conveyor 20, before the removed primal cut reaches the optical scanning station 24, then the next primal cut scanned at optical station 24 will not match the scanning data from the X-ray scanning station 14 since such X-ray scanning data will correspond to the primal cut that has been removed. Thus, the processor 18 will determine that there is not a match between the perimeter coordinate data sets of the primal cuts from the scanning stations 14 and 24. As such, the optical scanner 102 will scan the next primal cut which passes beneath the scanning station 24 to determine whether such next primal cut matches the scanning data of a primal cut scanned at the X-ray scanning station 14 and transmitted to the processor 18. The processor will determine whether the primal cut scanned at the optical station 24 corresponds to the primal cut that was scanned at the X-ray scanning station right after the X-ray scanning of the removed primal cut occurred. The processor 18 will match the correct scanning data from the X-ray scanning station 14 with the scanning data of the same primal cut from the optical scanning station 24. Of course, this is essential so that the location of the ribs within the primal cut located by the scanner 14 coincides with the primal cut scanned by optical scanner 24, since this information is utilized by the controller 26 to control the operation of cutters at the cutting station 28 to portion and/or trim the primal cut.

The processor will go through the "matching" process a finite number of times. One example of determining the number of data sets from the X-ray scanning that must be checked can be determined as follows. Divide the distance between scanners by the sum of the length of primal cut+the product gap+a dimensional factor of safety. For example, if there is a disclosure of 9 feet between the x-ray and optical scanners, and the primal cut is approximately 450 mm long product, then the maximum number of data sets in the queue that will be checked is calculated by: 9*12/(17.7+2+2)=4.9, so five matching attempts are made. The data set from the optical scanner will be compared to five data sets from the X-ray scanner stored in memory unit 42. For longer length products the number of data sets in the memory queue is smaller than for shorter primal cuts. Also, if the distance between the scanners is short enough, only one matching comparison is carried out. Also, it will be appreciated that differences or changes in belt speed can change the number of comparisons that are possible. With faster belt speed, there may need to be a larger gap between products and/or a larger safety margin and there will be less time to make the necessary calculations.

If no match occurs, a "no cut" error or "no match found" error message is generated. The system proceeds to the next primal cut arriving in the optical scanner, and searching for the new primal cut is initiated.

If for example one primal cut is removed from the conveyor 12 after the X-ray scanning but before the optical scanning, only two matching attempts should be required before a match occurs. However, in the unlikely event that a primal cut is so distorted in the transfer from belt 16 to belt 22 that the system 10 fails to recognize the X-ray image of the primal cut, then after the predetermined matching attempts the primal cut will proceed down the belt 22 without being trimmed/portioned. The above noted error message is generated, and the uncut primal cut can be identified or marked by the system 10 and can be removed to a specific location for re-working or other disposition.

As an alternative to not cutting or trimming the primal cut, the system can use the last best available match to cut/trim the primal cut. In this regard, a suboptimal cut/trim of the primal cut may occur, which nonetheless may be valuable or useful. However, if suboptimal cuts/trims lead to lost yield, such cuts/trims can be avoided.

It will be appreciated that there is no attempt to continuously track the location of the primal cut from X-ray scanning station 14 to optical scanning station 24. Rather, the foregoing described methodologies are used to match the primal cut scanned at X-ray scanning station 14 with the same primal cut scanned at optical station 24. Also, although the foregoing description does indicate that the system of the present disclosure can be used to locate the primal cut on the first and/or second conveyor at one or more specific points in time, the specific location of the primal cut is not continuously tracked. Moreover, in the present system 10, it is not necessary to locate the primal cut at any specific time along the conveyor 12.

Figure 7A:
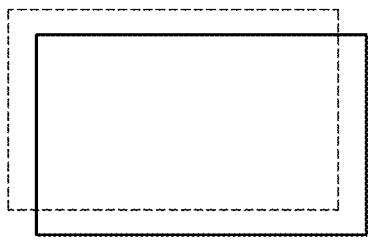
FIGS. 7A-7F are schematic views of possible movement of a primal cut when being transferred from a scanning conveyor belt to a portioning conveyor belt.

The scanning data from the scanning stations 14 and 24 can be used to determine whether or not the primal cut has transferred accurately from conveyor belt 16 to conveyor belt 22 and determine what level of physical distortion or movement of the primal cut has occurred during the transfer process. Such distortion or movement may include shifting of the primal cut side-to-side with respect to the center line or other datum line of the conveyors. The primal cut may also have shifted longitudinally along the length of the conveyor relative to the position of the primal cut on the conveyor 16. If shifting of the primal cut occurs in the X and/or Y direction(s), then processor 18 functions to translate or manipulate the X-ray image of the primal cut and the underlying data from the X-ray imaging to the optically scanned image of the primal cut so as to improve the match of the shapes or outlines of the primal cuts. This translation is schematically illustrated in FIG. 7A, wherein the primal cut as scanned at X-ray station 14 is shown in broken line and the primal cut as scanned at optical scanning station 24 is shown in solid line. The processor 18 translates the broken line image onto the optical image shown in solid line in FIG. 7A.

Figure 7B:
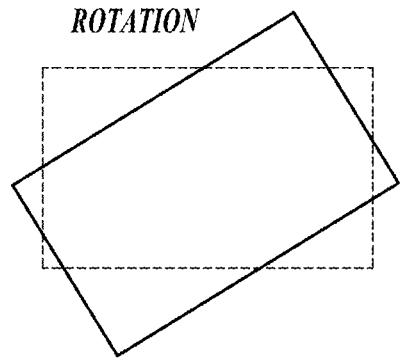

Transfer of the primal cut from conveyor belt 16 to conveyor belt 22 may also result in rotation of the primal cut as shown in FIG. 7B, wherein the primal cut as scanned by X-ray scanning station 14 is shown in broken line, whereas the primal cut as scanned by the optical scanning station 24 is shown in solid line. So that the cutter(s) at the cutter station 28 can accurately portion and/or trim the primal cut, the outline or shape data from the X-ray scanner is transformed onto the image data from the optical scanner 24.

Figure 7C:
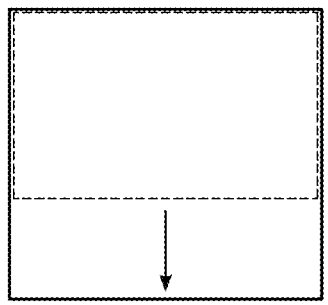
Figure 7D:

A further type of distortion that may occur during transfer of the primal cut from belt 16 to belt 22 is that the primal cut may increase or decrease in scale (length) in the Y direction (across belt 22) and/or in the X direction (along belt 22). FIG. 7C shows that the primal cut has increased in scale in the Y direction, whereas FIG. 7D shows that the primal cut has increased in scale in the X direction. Of course, the primal cuts may also decrease in scale in the X direction, especially if the scale is increased in the Y direction, and vice versa the primal cut may decrease in scale in the Y direction especially if increased in scale in the X direction. Nonetheless, the scanning data from the X-ray scanner 14 is transformed in terms of X and Y scale to the primal cut as scanned by the optical scanner 102.

Figure 7E:

Another form of distortion that may occur during the transfer of the primal cut from conveyor belt 16 to conveyor belt 22 is a distortion in shear in the X direction, as shown in FIG. 7E. In shear distortion, the primal cut may progressively distort or shift in the X direction across the width of the primal cut as shown in FIG. 7E. Of course, the shear distortion may occur as a mirror image as that shown in FIG. 7E. Also, the shear distortion is shown as occurring progressively linearly across the primal cut, but the shear distortion also may be non-linear across the primal cut. As with other types of distortion, shear distortion may be due to various causes, such as a difference in the speeds of the conveyors or imperfect alignment of the two conveyors. As a result, in the direction across the conveyor belt, the primal cut may have progressively shifted rearwardly or forwardly relative to the direction of travel of the conveyor belt.

FIG. 7E shows a forward (in the right-hand direction) shifting of the primal cut on the second conveyor belt 22 due to shear distortion. As noted above, of course the shear distortion could have occurred in the opposite direction (in the left-hand direction) so that the primal cut extends rearwardly relative to the nominal position of the primal cut going across the conveyor belt.

Figure 7F:
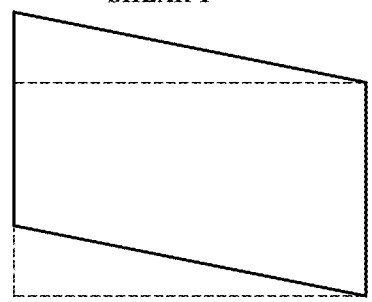

FIG. 7F illustrates that shear distortion can occur in the Y direction, wherein the primal cut shifts laterally relative to the belt along the length of the primal cut. FIG. 7F shows shear distortion of the primal cut in the Y direction (upward along the page). It will be appreciated that the shear distortion may occur in the opposite direction than as shown in FIG. 7F.

Regardless of the direction of the shear distortion, the data from the X-ray scanning is transformed onto the primal cut as scanned at the optical scanning station. Once the needed transformations have occurred to correct for movement and/or distortion of the primal cuts, the shape, size, and outline of the primal cut from the optical scanning has been better matched to the position, orientation, and/or shape of the primal cut as scanned by the optical station. Thereafter, other data from the X-ray scanning can be mapped onto the transformed primal cut, including the location of ribs or other bones within the primal cut. Such mapping can be carried out by well-known techniques.

It will be appreciated that without the foregoing transformation step or steps to correct or adjust for the distortion and/or shifting that may have occurred to the primal cut during transfer from conveyor 16 to conveyor 22, the mapping of the location of the ribs or other bones or cartilage as located during X-ray scanning to the primal cut as optically scanned may result in inaccurate information as to the position(s) of the ribs, cartilage or material within or on the primal cut. Thus, the portioning or trimming of the primal cut may result in a lower quality sub primal cut.

As with the "matching" analysis described above to verify that the primal cut optically scanned at optical scanning station 24 is the same primal cut that was previously scanned at X-ray scanning station 14, the data sets analyzed by the processor 18 to perform the above transformations may consist of coordinate locations along the outer perimeter of the primal cut. In this regard, the processor 18 may compare the data consisting of coordinate locations along the outer perimeter of the primal cut as determined at the X-ray scanning station 24 with the corresponding coordinates of the same locations along the outer perimeter of the primal cut as determined at the optical scanning station 44. Such comparison of the data sets can be used to determine whether or not the primal cut upon transfer to the conveyor belt 22 has distorted or shifted, for example, in X-Y translation, rotation about the Z axis. Mismatch of the data sets will indicate what type(s) of distortion occurred and the extent of such distortion so that an appropriate correcting transformation of the X-Y scanning data can be applied to the primal cut as scanned by the optical scanner 102.

Once the primal cut PC has passed the optical scanning station 24, it moves on to the cutting station 28. As described above, the information from the X-ray scanning station and the optical scanning station are combined so that the locations of the ribs and cartilage are known.

Various types of cutting devices can be utilized at cutting station 28 to remove to portion or trim the primal cuts as desired. One type of cutter 106 that may be used employs high-pressure waterjets as disclosed in U.S. Pat. Nos. 4,875,254, 5,365,186, and 5,868,056, and incorporated herein by reference.

As schematically shown in FIG. 3, the waterjet cutter 106 includes a nozzle 108 that may be moved relative to the conveyor 22 longitudinally of the conveyor and laterally of the conveyor, as well as vertically relative to the conveyor surface. This enables the waterjet cutter 106 to portion and/or trim the primal cut so as to achieve a desired sub primal cut.

Although FIG. 3 only shows one waterjet cutter 106, it is to be understood that at least several waterjet cutters can be utilized in conjunction with the system 10 so as to achieve a desired production level. For example, four, eight, or even more waterjet cutters can be utilized in coordinated fashion to cut and/or trim the primal cuts at the cutting station 30.

As will be appreciated, cutter 106 under the control of controller 26, is capable of precisely portioning primal cuts into sub primal cuts as well as trimming primal cuts into sub primal cuts due to their high speed operation and the preciseness with which they can be moved under the control of the controller 26. This enables the cutters 106 to cut and/or trim primal cuts to include the rib tip portions with spare rib racks or spare rib sub racks, while at the same time avoiding the inclusion of the brisket cartilage as part of the spare rib rack or a spare rib sub rack. The X-ray scanner is capable of modeling the primal cut and the position of the ribs or other bones in the primal cut, and then determines how to trim or portion the primal cut into sub primal cuts and then execute the cutting or trimming of the primal cuts. In this regard, the travel path of the cutter 106 can be precisely controlled so as to pass between adjacent ribs while maintaining an equal amount of meat on both of the ribs to each side of the traveling cutter 106. This same precision and accuracy often is not achievable by personnel utilizing a knife or even a powered band saw to trim and/or portion primals because the ribs or other type of bones in the primal cut are not visible, but rather are embedded within the primal cut. This limitation is overcome by the system 10 of the present disclosure.

Once the primal cut has been portioned and/or trimmed into one or more sub primal cuts, the sub primal cuts (or the trim) may be removed from the conveyor 20 at pickup station 30. At station 30, one or more pickup devices 110 are controlled by controller 26 for removing the sub primal cuts (or trim) from the conveyor 20 for placement on a takeaway conveyor (not shown) or other location.

The pickup device 110 may be automatically operated by the controller 26. In this regard, the controller 26 tracks the locations of the sub primal cut on the conveyor 20 and uses this known location to control the operation of pickup device 110 to automatically remove the primal cut from the conveyor. The pickup device 110 may include an attachable portion 112 capable of secure attachment with the sub primal cut so as to lift the sub primal cut from the conveyor belt 22 and carry the sub primal cut laterally or longitudinally relative to the direction of movement of the conveyor 22, to a takeaway conveyor or other location. The attachable portion 152 may utilize suction action or other methodology to grasp a sub primal cut. Pickup devices suitable for use in conjunction with the present invention are disclosed in U.S. Pat. No. 6,826,989, incorporated herein by reference.

As noted above, FIG. 3 illustrates a singular pickup device 110; however, a plurality of pickup devices may be employed to pick up and remove the sub primal and/or the trim to achieve a desired production volume from the system 10. Further, although the pickup device 110 is illustrated as a multidirectional actuator, instead a high speed multidirectional robot may be employed. Such robots are articles of commerce.

It is to be appreciated that sub primal cuts may be removed from the conveyor 20 by other methods in addition to using pickup devices 110. For example, an arm (not shown) may be used to push or sweep the sub primals from the belt 22, or a powered ram can be employed to push or sweep the sub primals from the conveyor. As a further alternative, the sub primals may be allowed to simply fall off the end of the conveyor onto another conveyor, into a container, etc. Thus, the present disclosure is not intended to limit the disposition of the sub primals.

Figure 8:
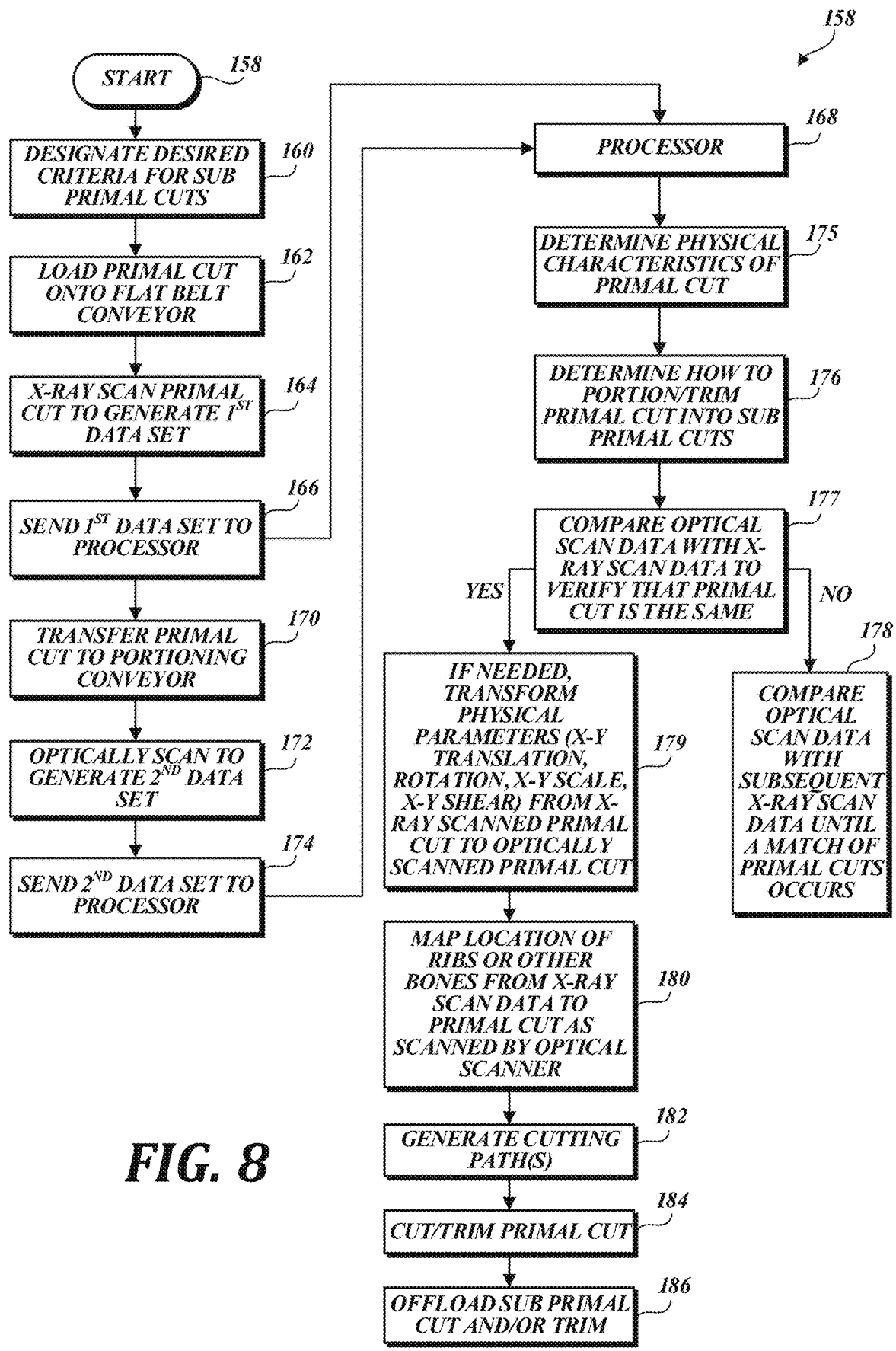
FIG. 8 is a flow diagram illustrating a method according to the present disclosure.

One method 158 of utilizing the processing system 10 of the present disclosure is schematically illustrated in FIG. 8. The process begins at step 160 wherein desired criteria for the sub primal cuts are designated. As discussed above, such criteria can include physical characteristics of the sub primal cuts as well as production requirements of the sub primal cuts. Next, primal cuts are loaded onto flat belt conveyor 16 at step 162. Thereafter, the primal cuts are scanned using X-ray detector system 60 at scanning station 14, as designated by step 164, thereby to create a first data set pertaining to the physical parameters of the primal cut. Next, at step 166, the first data set from the scanning of the primal cut is transmitted to processor 18.

Thereafter, at step 170, the primal cut is transferred from the X-ray scanning conveyor 12 to the portioning conveyor 20. Next at step 172, the primal cut is optically scanned at optical scanning station 24 utilizing optical scanner 102 to create a second data set pertaining to the physical parameters of the scanned primal cut. Further in step 174, the data generated at optical scanning station 24 is transmitted to the processor 18.

Next, at step 175, the processor determines the physical characteristics of the scanned primal cut. Then, at step 176, the processor determines what sub primal cuts can be harvested from the primal cut, and also how to trim/portion the primal cut into the determined sub primal cuts.

Thereafter, at step 177, the processor 18 compares the optical scanned data with the previously received X-ray scanned data to determine whether or not the primal cut being optically scanned is the same as that which was previously scanned by the X-ray scanner. As discussed above, the data being compared can consist of coordinate locations along the outer perimeter of the primal cut.

Various methods and techniques can be used to compare the first data set from the X-ray scanner 60 with the second data set from the optical scanner 102 to verify that the primal cut scanned by the optical scanner corresponds to the primal cut previously scanned by the X-ray scanner. For example, the Root Mean Square (RMS) error between the two data sets can be calculated and such error value compared with the maximum RMS previously established for verifying that the primal cut scanned by the X-ray scanner is the same as the primal cut scanned by the optical scanner. In this regard, an RMS error is calculated for each corresponding coordinate locations along the outer perimeter of the primal cut. In essence, the difference in position of each of the coordinates is calculated as the root square of the sum of the squares of the difference in X and Y coordinate values. Thereafter, the square values of these distances are summed up, and the sum is divided by the number of corresponding coordinate pairs. Finally, the square root of the quotient is taken as an RMS error. The calculated RMS error is compared with the pre-established maximum RMS error allowable and still concluding that the same primal cut was scanned by the optical scanner and the X-ray scanner.

Another analysis methodology that may be utilized is by determining the difference in the X and Y coordinate values of each location along the primal cut and selecting a standard deviation that defines an acceptable variation or difference in the X-Y coordinate values. In this technique, a confidence level may be defined in terms of the standard deviation at each of the various coordinate locations along the perimeter of the primal cut. An acceptable confidence level or level of allowable standard deviation between the X-Y coordinate is established ahead of time.

Other regression analysis techniques may also be utilized, for example the least squares regression analysis.

If it is determined that the primal cut from the optical scan matches that of the previous X-ray scan, then at step 179, the processor proceeds to determine if there is a need to transform physical parameter data from the X-ray scanning results to the optical scanning results due to movement or distortion of the primal cut when transferred to the second conveyor 20. As discussed above, such distortion may include X and/or Y translation of the primal cut, rotation of the primal cut about the Z axis, change in scale of the primal cut in the X and/or Y directions, and shear distortion in the X and/or Y directions. If sufficient shifting or distortion in the primal cut has occurred, then the requisite transformations are carried out by the processor 18. As a result, a close match is achieved between the configuration, including, for example, outer perimeter and size and shape of the primal cut as scanned by the X-ray scanner 60 and optically scanned by the optical scanner 102.

If, on the other hand, it is determined that the primal cut from the optical scan does not match that of the previous X-ray scan, then the processor at step 178 compares the optically scanned data with the next data set received from the X-ray scanning to determine whether the next primal cut on the conveyor belt is the same as the primal cut from the optical scan. In this situation, if a single primal cut was removed from either first conveyor 12 or second conveyor 20 at a location upstream from the optical scanning station 24, then the next primal cut traveling along the conveyors will correspond to the primal cut which was optically scanned. However, if more than one primal cut was removed from the conveyors upstream from optical scanning station 24, then the processor 18 continues with the comparison analysis until a match occurs between the primal cut, which has been optically scanned, and the corresponding primal cut which has been scanned at X-ray scanning station 14. Once a match has been achieved in the data sets from the X-ray scanning and the optical scanning, then the process moves to step 179 to determine if there is a need to carry out any transformations as discussed above.

Next, at step 180, the location of the ribs or bones as determined by the X-ray scanning is mapped onto the configuration of the primal cut as determined from the optical scanning and after necessary transformations have been applied, as discussed above. Therefore, in step 182, the cutting path for the waterjet or other type of cutter is generated by the processor 18. Next, in step 184, the primal cut is cut to portion or trim the primal cut into sub primal cuts of desired types, sizes, weights, shapes, etc. Then lastly, in step 186, the sub primal cuts that have been produced in accordance with desired physical parameters, and production requirements, are offloaded, for example, to a takeaway conveyor, a collection bin, etc.

While illustrative embodiments have been illustrated and described, it will be appreciated that various changes can be made therein without departing from the spirit and scope of the invention. For example, at least in some circumstances the primal may transfer precisely enough to the conveyor 20 that the second scanning at station 24 is not required, as least not to verify that the primal cut has not shifted when transferred to the second conveyor. In this case, a determination may be made to forgo the second scanner all together. Another option is to include the second scanning station, but not use the second scan when it is not needed and use it when needed.

Also, there may be situations where the sub primal cut does not include a bone, for example if the rib cage primal cut was incorrectly split so that a sub primal does not include a bone. Also, there may not be bone in the portioned/removed rib tip or in the portioned/removed brisket.

The embodiments of the invention in which an exclusive property or privilege is claimed are defined as follows:

1. A method for portioning or trimming a ribcage primal cut of a quadruped animal with an embedded bone array into one or more sub primal cuts and/or different types of sub primal cuts, comprising:
   (a) designating desired criteria of the sub primal cuts;
   (b) scanning the primal cut to generate a first data set regarding the physical characteristics of the primal cut;
   (c) using the first data set to determine the physical characteristics of the primal cut including the location and size of the bones of the bone array;

(d) determining how to divide the primal cut into one or more sub primal cuts in accordance with:
   the determined physical characteristics of the primal cut; and
   desired criteria of the sub primal cuts comprising desired designated physical characteristics of the sub primal cuts; and
(e) cutting the primal cut into one or more sub primal cuts in accordance with the determination on how to divide the primal cut.

2. The method of claim 1, further comprising:
(a) using the first data set to generate a model of the primal cut including the locations and sizes of the bones of the bone array;
(b) simulating dividing the modeled primal cut into a plurality of sets of sub primal cuts with at least one sub primal cut; and
(c) rating each of the simulated sets of modeled sub primal cuts based on the desired physical characteristics of the sub primal cuts.

3. The method of claim 2, wherein the model of the primal cut is selected from the group including a two-dimensional model and a three-dimensional model.

4. The method of claim 2, wherein the model of the primal cut includes determinations selected from the group consisting of the number of bones in the primal cut, the location of the bones in the primal cut, the size of the bones in the primal cut, the shape of the bones in the primal cut, whether any of the bones in the primal cut are broken or otherwise damaged.

5. The method according to claim 2, wherein the model includes determinations selected from the group consisting of length of the primal cut, the width of the primal cut, the aspect ratio of the primal cut, the size of the primal cut, the weight of the primal cut, the shape of the primal cut, the thickness of the primal cut, the flatness of the primal cut, the fat content of the primal cut, the location of fat on the primal cut, the extent of gristle in the primal cut, the location of the gristle in the primal cut, the amount of cartilage in the primal cut, the location of the cartilage in the primal cut.

6. The method according to claim 1, wherein the desired designated physical characteristics of the sub primal cuts comprising the physical characteristics of established types of sub primal cuts.

7. The method according to claim 6, wherein the established types of sub primal cuts comprise pork sub primal cuts selected from the group consisting of St. Louis style ribs, Kansas City style ribs, spare rib rack, spare rib sub rack, baby back rib rack, baby back rib sub rack, country style ribs.

8. The method of claim 1, wherein the desired designated physical characteristics of the sub primal cuts are selected from the group consisting of the weight of the sub primal cut, the size of the sub primal cut, the shape of the sub primal cut, the length of the sub primal cut, the width of the sub primal cut, the thickness of the sub primal cut, the flatness of the sub primal cut, the fat content of the sub primal content, the cartilage content of the sub primal cut.

9. The method according to claim 1, wherein the desired designated physical characteristics of the sub primal cuts are selected from the group consisting of the number of bones in the sub primal cut, the size of the bones in the sub primal cut, the location of the bones in the sub primal cut, the condition of the bones in the sub primal cut, whether any of the bones in the sub primal cut are broken or otherwise damaged.

10. The method according to claim 9, wherein the desired criteria of the sub primal cut comprises the production requirements for the sub primal cuts selected from the group consisting of: the total number of sub primal cuts; the total number of each type of sub primal cut; the total weight of the sub primal cuts; the total weight of each type of sub primal cut; the maximum weight of the sub primal cut; the minimum weight of the sub primal cut; the maximum length of the sub primal cut; the minimum length of the sub primal cut; the maximum width of the sub primal cut; the minimum width of the sub primal cut; the maximum thickness of the sub primal cut; the minimum thickness of the sub primal cut; the value of the sub primal cut.

11. The method of claim 1, further comprising identifying the desired physical characteristics of a plurality of acceptable sub primal cuts to be portioned from a primal cut and rating each of the plurality of acceptable sub primal cuts according to value.

12. The method according to claim 1, further comprising conveying the primal cut during scanning on a first conveyor that is structurally compatible with the scanning technology being used in scanning the primal cut, and then conveying the scanned primal cut on a second conveyor during the cutting of the primal cut, the second conveyor that is structurally compatible with the cutting technology used to cut the primal cut.

13. The method according to claim 12, further comprising scanning the primal cut on the second conveyor to generate a second data set corresponding to physical parameters of the primal cut selected from the group consisting of the location of the primal cut on the second conveyor, the orientation of primal cut on the second conveyor, the shape of the primal cut, the size of the primal cut, etc.

14. A system for portioning or trimming an animal ribcage primal cut having a bone array located in the primal cut into one or more sub primal cuts of designated desired criteria, each sub primal cut having at least one bone located therein, comprising:
(a) a conveyor for conveying the primal cut;
(b) a scanner for scanning the primal cut to generate a first data set regarding the physical characteristics of the primal cut;
(c) a cutter for cutting the primal cut into one or more sub primal cuts;
(d) a control system,
   (i) using the first data set to determine the physical characteristics of the primal cut, including the location and size of the bones of the bone array;
   (ii) determining how to divide the primal cut into one or more sub primal cuts in accordance with: (A) the determined physical characteristics of the primal cut; and (B) desired criteria comprising desired physical characteristics of the sub primal cuts; and
   (iii) controlling the cutter to divide the primal cut into one or more sub primal cuts according to the determination on how to cut the primal cut.

15. The system of claim 14, wherein the determined physical characteristics of the primal cut are selected from the group consisting of: the number of bones in the primal cut; the location of the bones in the primal cut; the size of the bones in the primal cut; the shape of the bones in the primal cut; whether any of the bones in the primal cut are broken or otherwise damaged.

16. The system according to claim 14, wherein the determined physical characteristics of the primal cut are selected from the group consisting of the length of the primal cut, the width of the primal cut, the aspect ratio of the primal cut, the size of the primal cut, the weight of the primal cut, the shape of the primal cut, the thickness of the primal cut, the flatness of the primal cut, the fat content of the primal cut, the location of fat on the primal cut, the extent of gristle in the primal cut, the location of the gristle in the primal cut, the amount of cartilage in the primal cut, the location of the cartilage in the primal cut.

17. The system according to claim 14, wherein the desired designated physical characteristics of the sub primal cuts comprising the physical characteristics of established types of sub primal cuts.

18. The system according to claim 17, wherein the established types of sub primal cuts comprise pork sub primal cuts selected from the group consisting of St. Louis style ribs, Kansas City style ribs, spare rib rack, spare rib sub rack, baby back rib rack, baby back rib sub rack, country style ribs.

19. The system according to claim 14, wherein the desired designated physical characteristics of the sub primal cuts are selected from the group consisting of the weight of the sub primal cut, the size of the sub primal cut, the shape of the sub primal cut, the length of the sub primal cut, the width of the sub primal cut, the thickness of the sub primal cut, the flatness of the sub primal cut, the fat content of the sub primal content, the cartilage content of the sub primal cut, the value of the sub primal cut.

20. The system according to claim 14, wherein the desired designated physical characteristics of the sub primal cuts are selected from the group consisting of the number of bones in the sub primal cut, the size of the bones in the sub primal cut, the location of the bones in the sub primal cut, the condition of the bones in the sub primal cut, whether any of the bones in the sub primal cut are broken or otherwise damaged.

* * * * *